United States Patent
Ito

(10) Patent No.: US 11,067,779 B2
(45) Date of Patent: Jul. 20, 2021

(54) ZOOM LENS AND IMAGE PICKUP APPARATUS INCLUDING THE SAME

(71) Applicant: CANON KABUSHIKI KAISHA, Tokyo (JP)

(72) Inventor: Daisuke Ito, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 163 days.

(21) Appl. No.: 16/267,934

(22) Filed: Feb. 5, 2019

(65) Prior Publication Data
US 2019/0243111 A1   Aug. 8, 2019

(30) Foreign Application Priority Data
Feb. 6, 2018  (JP) .............................. JP2018-019219

(51) Int. Cl.
  *G02B 15/14*   (2006.01)
  *G02B 15/20*   (2006.01)
  *G03B 5/00*    (2021.01)

(52) U.S. Cl.
  CPC ..... *G02B 15/1441* (2019.08); *G02B 15/1431* (2019.08); *G02B 15/1451* (2019.08); *G02B 15/20* (2013.01); *G03B 5/00* (2013.01); *G03B 2205/0046* (2013.01)

(58) Field of Classification Search
None
See application file for complete search history.

(56) References Cited

U.S. PATENT DOCUMENTS

| 4,749,266 A | 6/1988 | Takahashi et al. |
|---|---|---|
| 9,069,156 B2 | 6/2015 | Ito et al. |
| 2011/0002045 A1 | 1/2011 | Li |
| 2013/0215518 A1 | 8/2013 | Mitsuhashi |

(Continued)

FOREIGN PATENT DOCUMENTS

| EP | 2690481 A1 | 1/2014 |
|---|---|---|
| JP | S5173450 A | 6/1976 |

(Continued)

OTHER PUBLICATIONS

Notice of Reasons for Refusal issued by the Japanese Patent Office dated Mar. 3, 2020 in corresponding Japanese Patent Application No. 2018-019219, with English translation.

*Primary Examiner* — Darryl J Collins
(74) *Attorney, Agent, or Firm* — Carter, DeLuca & Farrell LLP

(57) ABSTRACT

Provided is a zoom lens including a plurality of lens units in which intervals between adjacent lens units are changed during zooming. The plurality of lens units consist of, in order from object side to image side, a positive first lens unit, a negative second lens unit and a rear lens group including at least one lens unit. A minimum F-number of zoom lens during zooming from wide angle end to telephoto end, an interval, at wide angle end, between a lens surface on object side of a lens arranged closest to object side of rear lens group and a lens surface on image side of a lens arranged closest to image side of rear lens group, a total lens length of zoom lens at wide angle end, and the widest lens interval at wide angle end among lens intervals included in rear lens group are each appropriately set.

28 Claims, 17 Drawing Sheets

(56) References Cited

U.S. PATENT DOCUMENTS

| | | | |
|---|---|---|---|
| 2015/0234165 A1* | 8/2015 | Sakamoto | G02B 15/17 |
| | | | 359/688 |
| 2016/0048007 A1* | 2/2016 | Takada | G02B 15/173 |
| | | | 359/684 |
| 2016/0109692 A1* | 4/2016 | Shibata | G02B 15/173 |
| | | | 359/557 |
| 2017/0052353 A1* | 2/2017 | Yamasaki | G02B 15/173 |
| 2018/0180848 A1 | 6/2018 | Ito | |

FOREIGN PATENT DOCUMENTS

| | | |
|---|---|---|
| JP | S5931920 A | 2/1984 |
| JP | S60260912 A | 12/1985 |
| JP | S6329718 A | 2/1988 |
| JP | S6474517 A | 3/1989 |
| JP | H06281862 A | 10/1994 |
| JP | H11174323 A | 7/1999 |
| JP | 2007093974 A | 4/2007 |
| JP | 2010014866 A | 1/2010 |
| JP | 2011013536 A | 1/2011 |
| JP | 2013171207 A | 9/2013 |
| JP | 2013218298 A | 10/2013 |
| JP | 2017026974 A | 2/2017 |

* cited by examiner

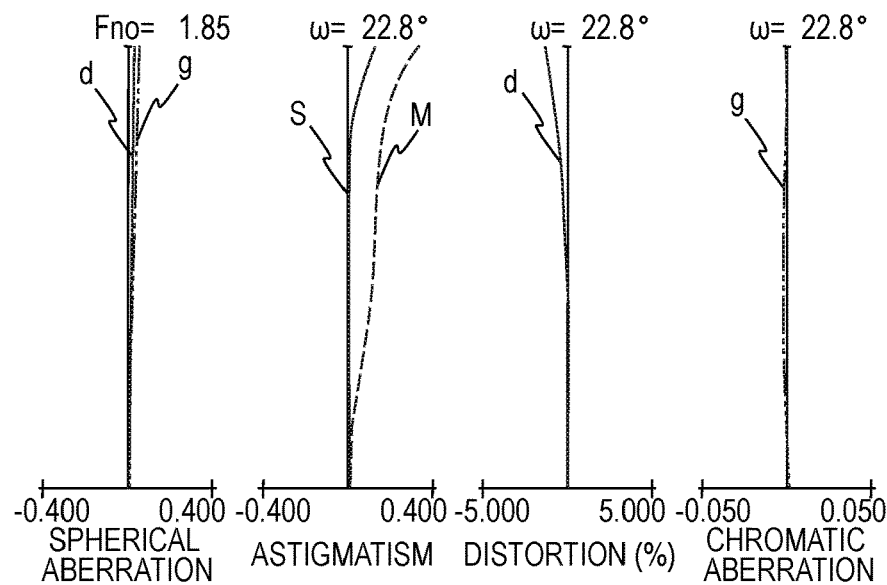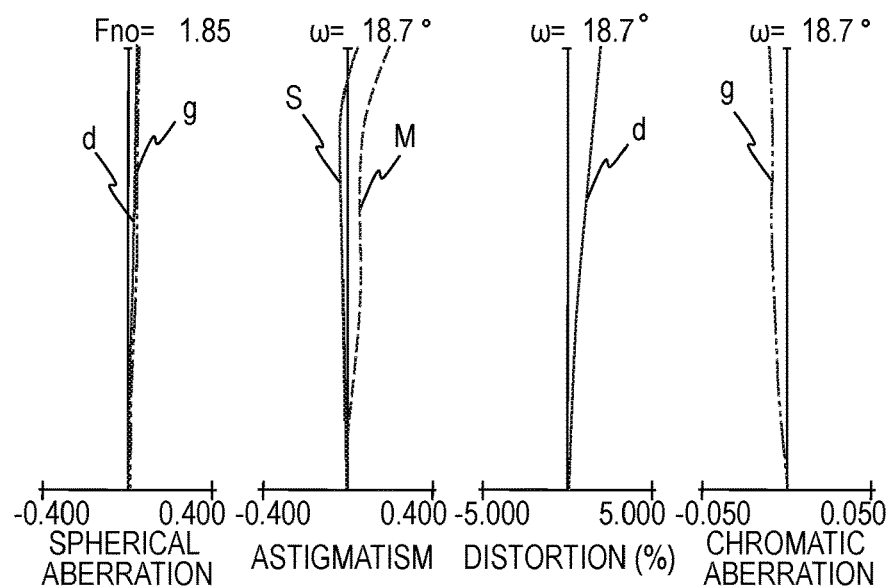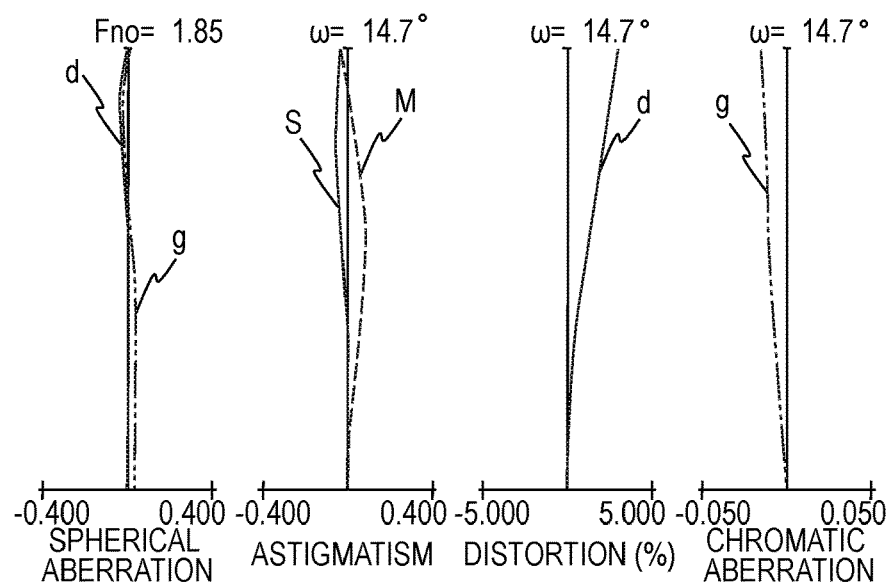

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, which are suitable for an image pickup apparatus using an image pickup element, for example, a video camera, an electronic still camera, a broadcasting camera, or a monitoring camera.

Description of the Related Art

Hitherto, as an image pickup optical system having a large aperture ratio, there has been well known an image pickup optical system having an F-number smaller than 2.5 and having a single focal length. Among image pickup optical systems having a large aperture ratio and having a single focal length, a person is selected as an object in many scenes in image pickup that uses an image pickup optical system having a focal length between a standard focal length (focal length of 50 mm) and a medium telephoto focal length (focal length of 85 mm), and such an image pickup optical system facilitates image pickup that utilizes a blur quality.

However, the image pickup optical system having a single focal length has a fixed focal length, and hence when the focal length is desired to be changed to another focal length, it is required to mount another image pickup optical system to an image pickup apparatus, which is time-consuming. Thus, when the focal length is desired to be changed, a user may miss a photo opportunity due to the time required for replacement, or may be required to carry many image pickup optical systems having different focal lengths, and hence the user may experience inconvenience.

Currently, there are few image pickup optical systems designed to have an intermediate focal length in an existing focal length range of an image pickup optical system of from the standard focal length (focal length of 50 mm) to the medium telephoto focal length (focal length of 85 mm). The user thus cannot finely select a focal length in some cases.

Hitherto, as a zoom lens to be used in the image pickup apparatus, there has been strongly demanded a zoom lens in which a focal length can be variably set in the range of from the standard focal length (focal length of 50 mm) to the medium telephoto focal length (focal length of 85 mm) and with which image pickup that utilizes a blur quality can easily be performed in various scenes. As a zoom lens in which the entire system of the zoom lens in the range of from the standard focal length (focal length of 50 mm) to the medium telephoto focal length (focal length of 85 mm) is downsized and an F-number is small, there has been known a positive lead-type zoom lens, in which a lens unit having a positive refractive power is arranged on an object side.

A zoom lens of U.S. Pat. No. 4,749,266 consists of, in order from an object side to an image side, a first lens unit having a positive refractive power, a second lens unit having a negative refractive power, a third lens unit having a positive refractive power, a fourth lens unit having a negative refractive power, and a fifth lens unit having a positive refractive power. Further, a rear lens group including the third lens unit and the subsequent lens units consists of 12 lenses. In zooming from a wide angle end to a telephoto end, an F-number is from 1.60 to 2.0, and a zoom ratio is about 10.

A zoom lens of U.S. Patent Application Publication No. 2011/0002045 consists of, in order from an object side to an image side, a first lens unit having a positive refractive power, a second lens unit having a negative refractive power, a third lens unit having a positive refractive power, a fourth lens unit having a positive refractive power, a fifth lens unit having a positive refractive power, and a sixth lens having a negative refractive power. A rear lens group including the third lens unit and the subsequent lens units consists of 10 lenses. In zooming from a wide angle end to a telephoto end, an F-number is from 2.17 to 2.40, and a zoom ratio is about 7.

A zoom lens of U.S. Patent Application Publication No. 2013/0215518 consists of, in order from an object side to an image side, a first lens unit having a positive refractive power, a second lens unit having a negative refractive power, a third lens unit having a positive refractive power, a fourth lens unit having a positive refractive power, and a fifth lens unit having a positive refractive power. A rear lens group including the third lens unit and the subsequent lens units consists of 10 lenses. In zooming from a wide angle end to a telephoto end, an F-number is from 1.62 to 1.77, and a zoom ratio is about 6.

In the positive lead-type zoom lens, in order to obtain high optical performance over the entire zoom range at a high zoom ratio while achieving a large aperture ratio, it is important to appropriately set, for example, the refractive power and lens configuration of each lens unit. In addition, in the zoom lens of the above-mentioned zoom type, it is important to appropriately set the lens configuration of the rear lens group including the third lens unit, which is arranged on the image side of the second lens unit.

For example, it is important to appropriately set the lens thickness of the rear lens group and to set, for example, the position on an optical axis, refractive power, and shape of an air lens, which is formed between lens surfaces located on both sides of air contained in the rear lens group. Unless those conditions are appropriately set, it becomes difficult to obtain a zoom lens having a high zoom ratio and high optical performance over the entire zoom range while achieving a large aperture ratio.

SUMMARY OF THE INVENTION

The zoom lens according to the present invention includes a plurality of lens units in which an interval between each pair of adjacent lens units among the plurality of lens units is changed during zooming. The plurality of lens units consist of, in order from an object side to an image side, a first lens unit having a positive refractive power, a second lens unit having a negative refractive power, and a rear lens group including at least one lens unit. The zoom lens satisfies the following conditional expressions:

$0.70 < F < 2.50;$ $0.43 < LRW/LW < 1.00;$ and $0.02 < LRAW/LRW < 0.30,$ where F represents the largest full aperture F-number of an entire system of the zoom lens during zooming from a wide angle end to a telephoto end, LRW represents an interval, at the wide angle end, between a lens surface on the object side of a lens arranged closest to the object side of the rear lens group and a lens surface on the image side of a lens arranged closest to the image side of the rear lens group, LW represents a total lens length of the zoom lens at the wide angle end, and LRAW represents a widest lens interval having a widest interval at the wide angle end among lens intervals included in the rear lens group.

Further features of the present invention will become apparent from the following description of exemplary embodiments with reference to the attached drawings.

BRIEF DESCRIPTION OF THE DRAWINGS

FIG. 8A is aberration diagrams of the zoom lens according to Example 4 at the wide angle end.

FIG. 8B is aberration diagrams of the zoom lens according to Example 4 at an intermediate zoom position.

FIG. 8C is aberration diagrams of the zoom lens according to Example 4 at a telephoto end.

DESCRIPTION OF THE EMBODIMENTS

Preferred embodiments of the present invention are now described with reference to the accompanying drawings.

A zoom lens according to one embodiment of the present invention includes, in order from an object side to an image side: a first lens unit having a positive refractive power; a second lens unit having a negative refractive power; and a rear lens group including at least one lens unit. Intervals between adjacent lens units are changed during zooming.

Figure 1:
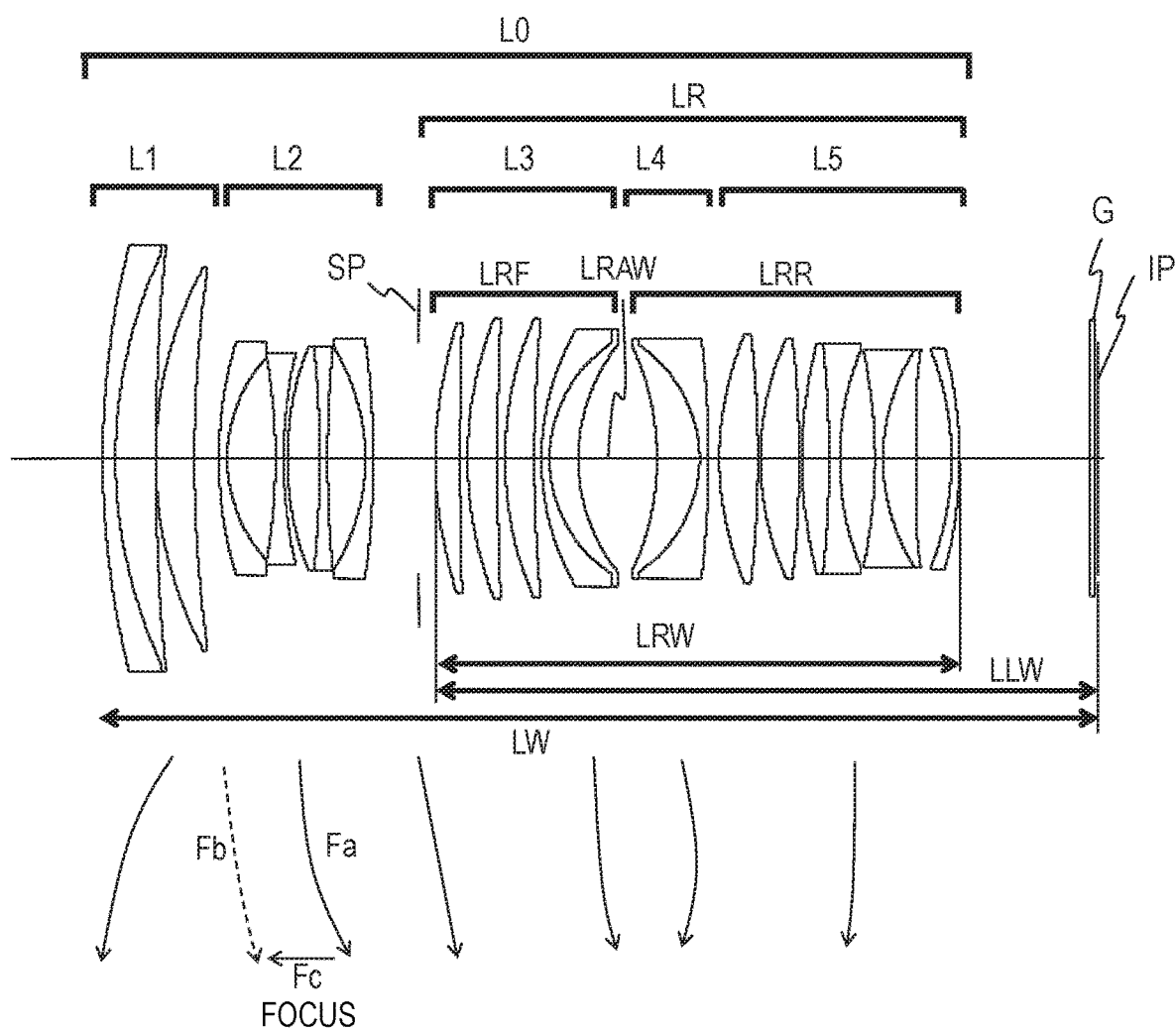
FIG. 1 is a lens cross-sectional view of a zoom lens according to Example 1 of the present invention at a wide angle end.
Figure 2A:
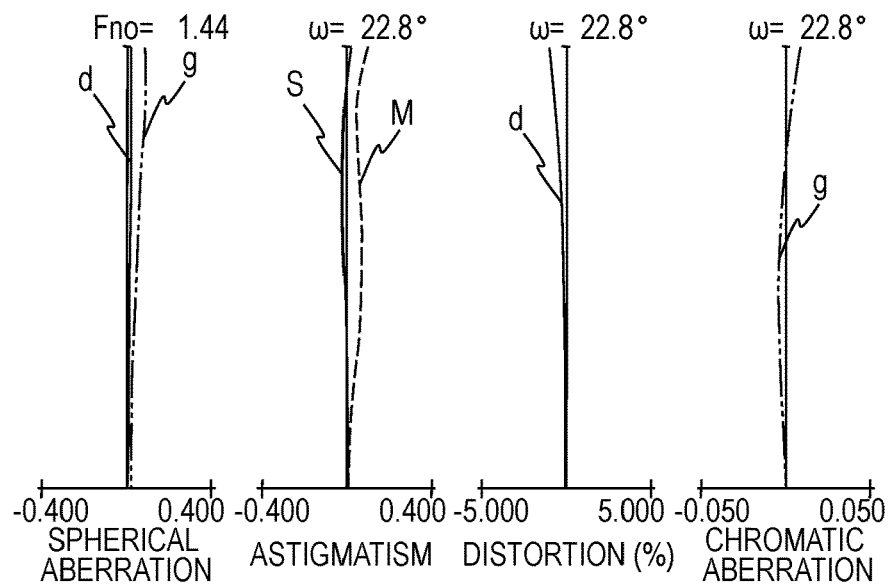
FIG. 2A is aberration diagrams of the zoom lens according to Example 1 at the wide angle end.
Figure 2B:
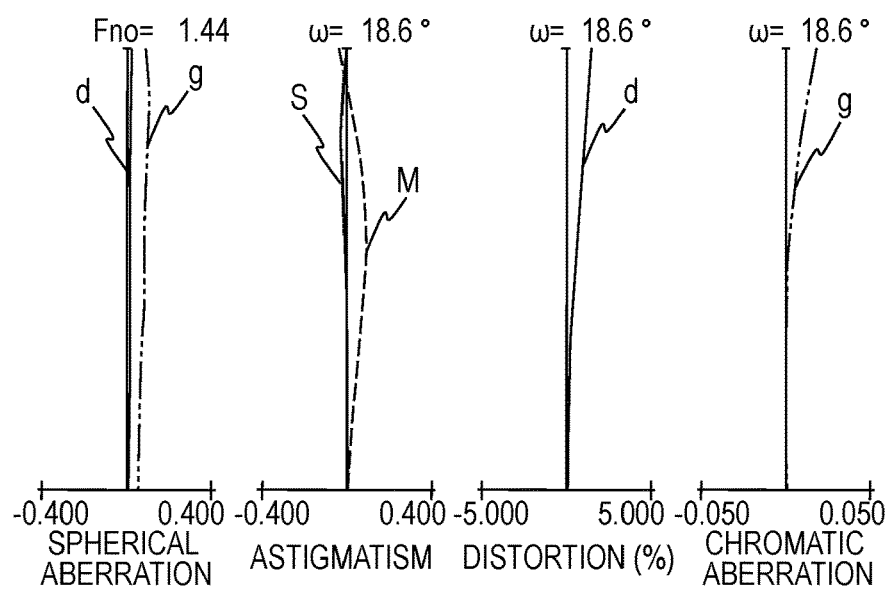
FIG. 2B is aberration diagrams of the zoom lens according to Example 1 at an intermediate zoom position.
Figure 2C:
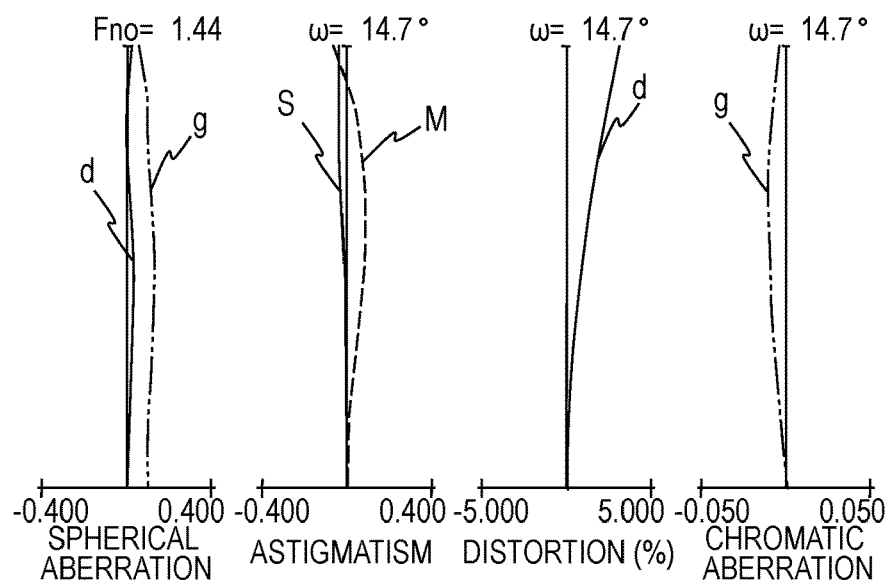
FIG. 2C is aberration diagrams of the zoom lens according to Example 1 at a telephoto end.
Figure 3:
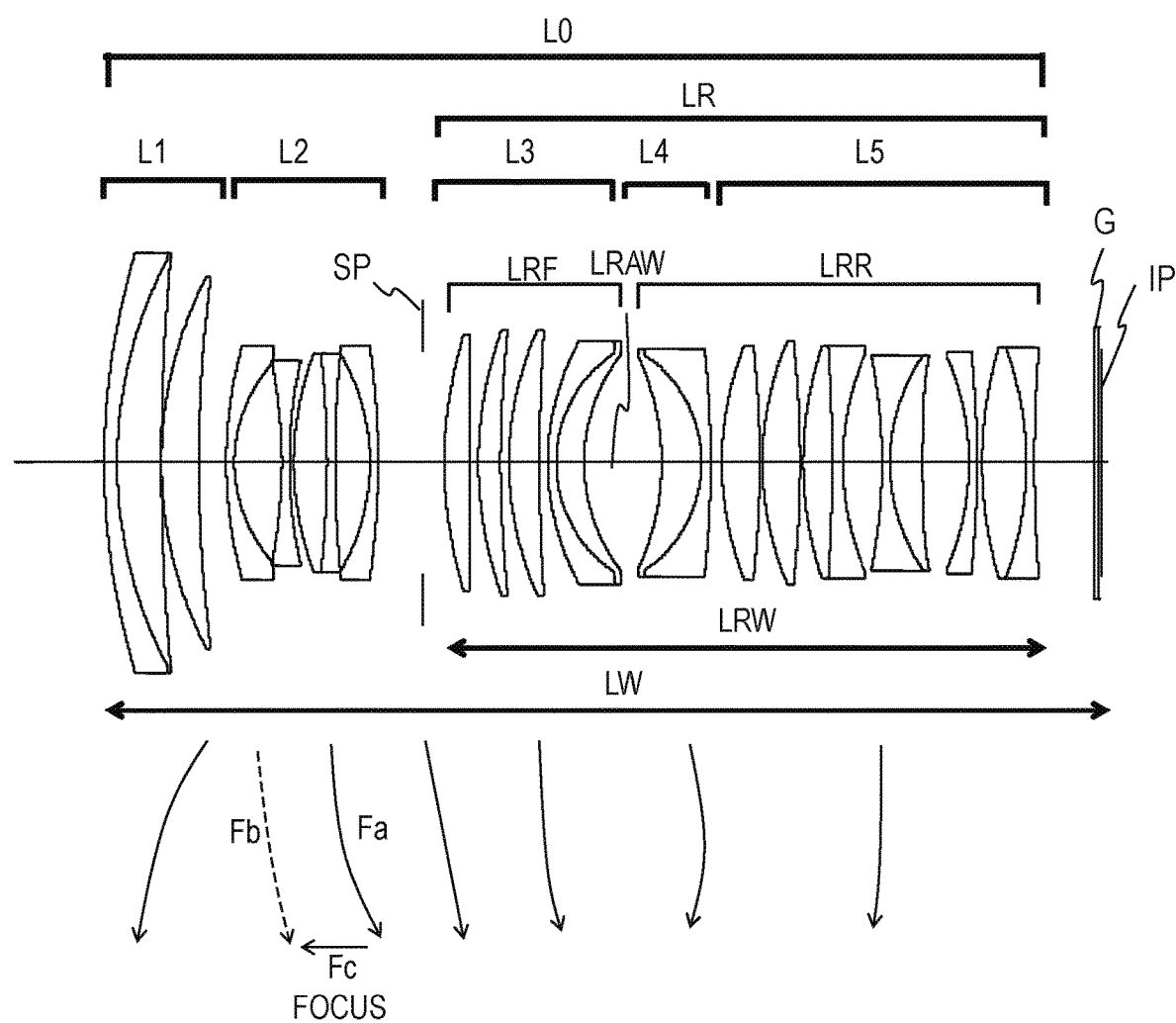
FIG. 3 is a lens cross-sectional view of a zoom lens according to Example 2 of the present invention at a wide angle end.
Figure 4A:
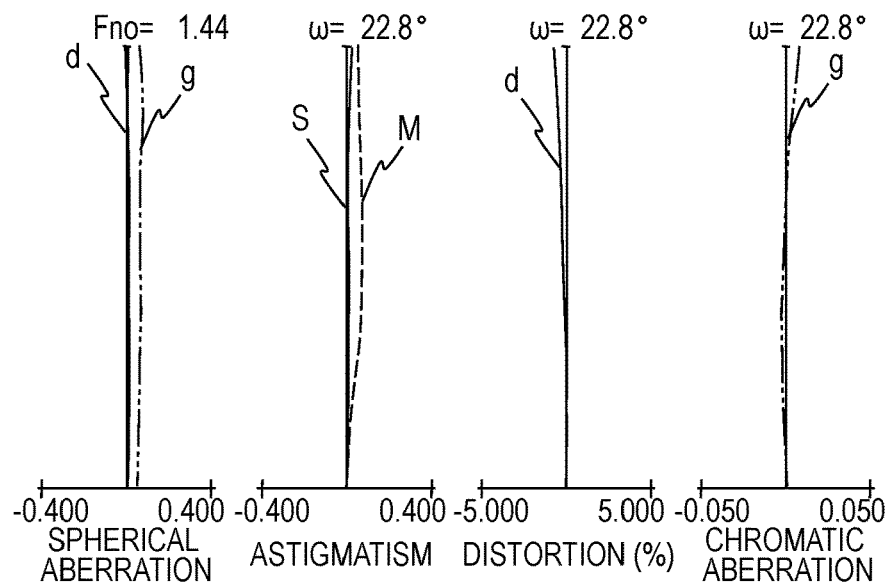
FIG. 4A is aberration diagrams of the zoom lens according to Example 2 at the wide angle end.
Figure 4B:
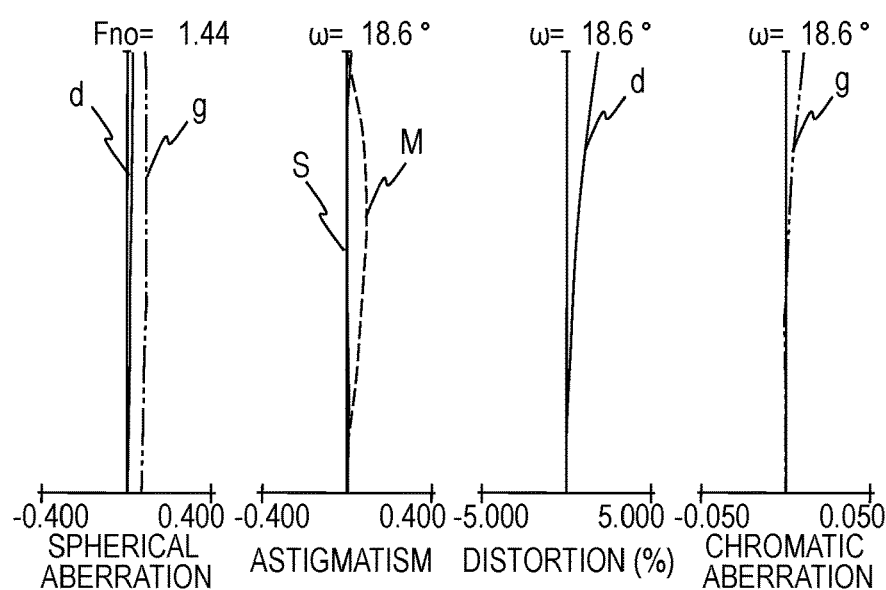
FIG. 4B is aberration diagrams of the zoom lens according to Example 2 at an intermediate zoom position.
Figure 4C:
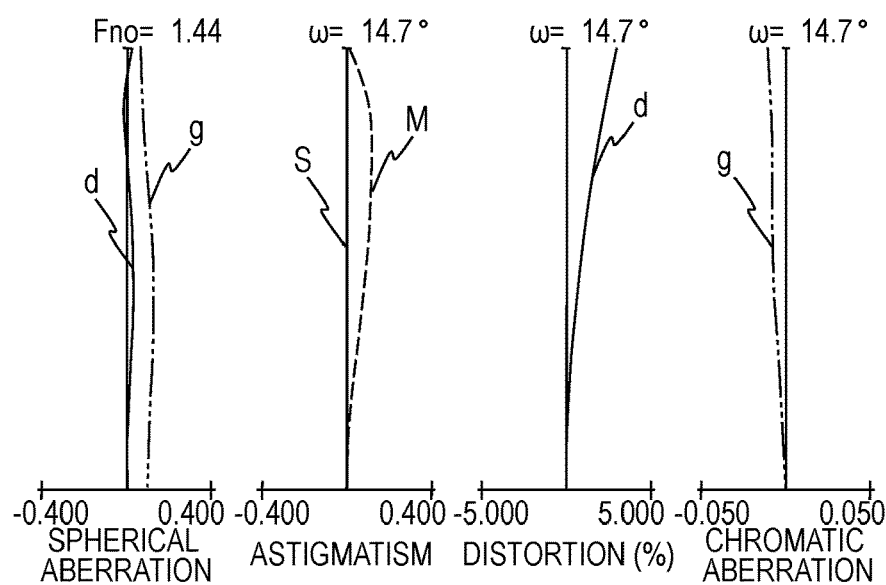
FIG. 4C is aberration diagrams of the zoom lens according to Example 2 at a telephoto end.
Figure 5:
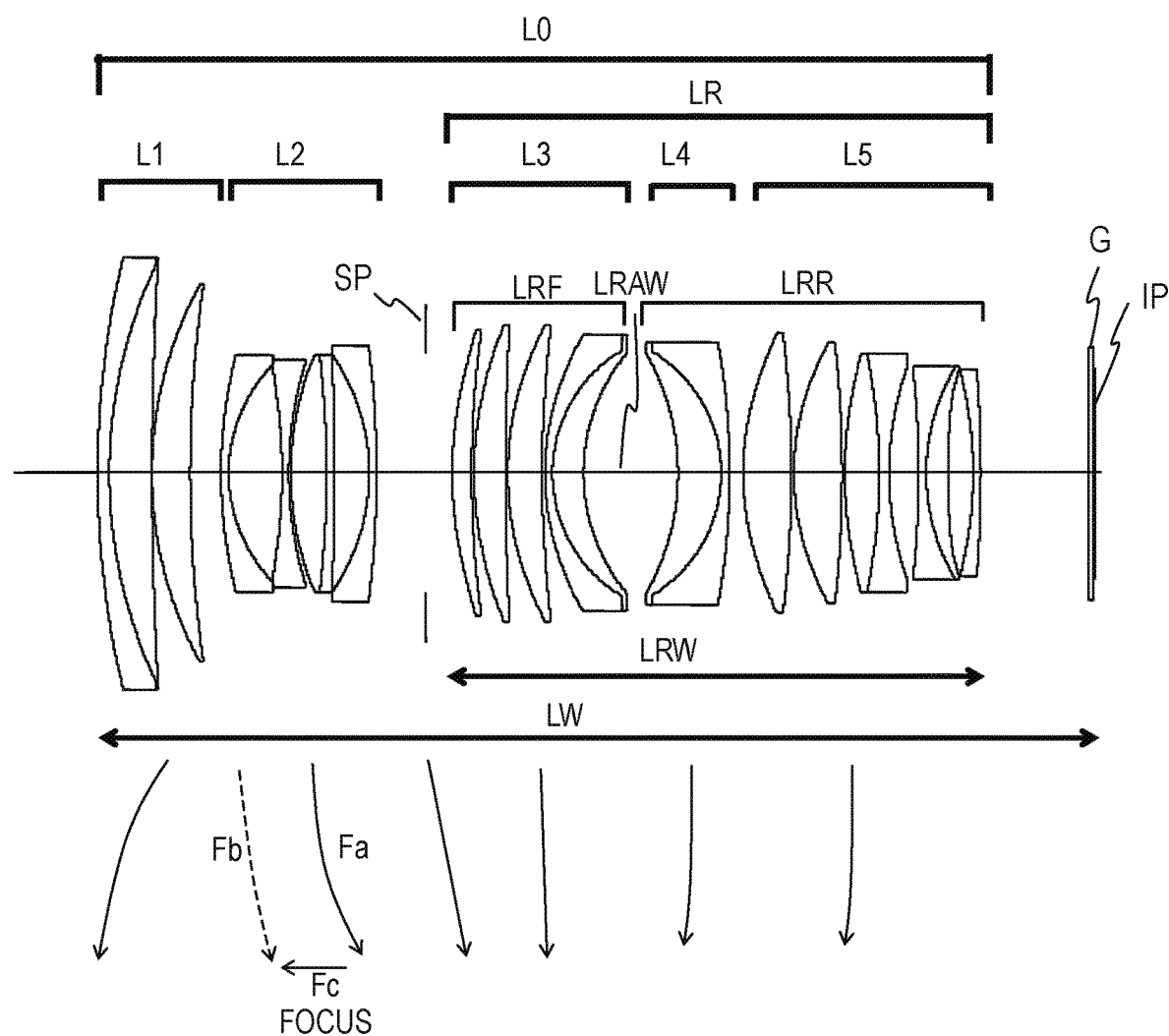
FIG. 5 is a lens cross-sectional view of a zoom lens according to Example 3 of the present invention at a wide angle end.
Figure 6A:
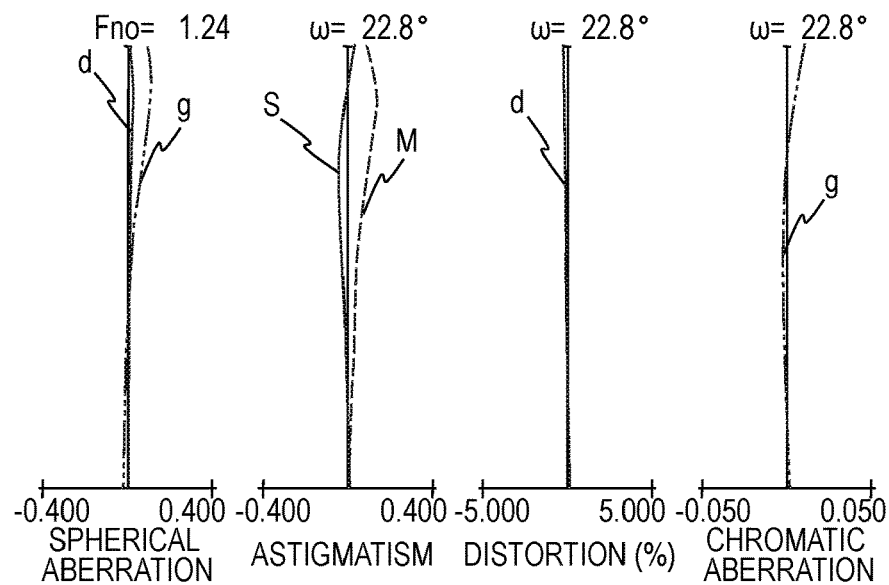
FIG. 6A is aberration diagrams of the zoom lens according to Example 3 at the wide angle end.
Figure 6B:
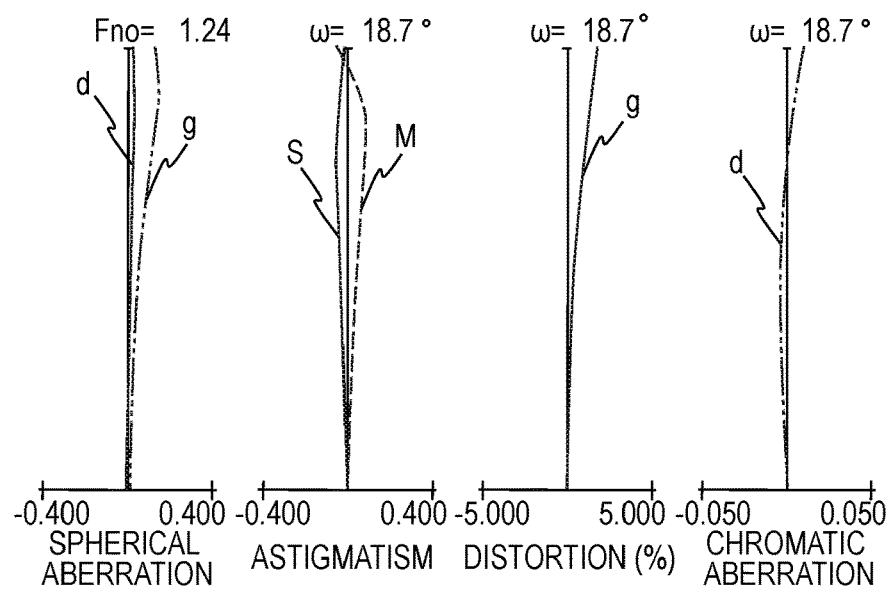
FIG. 6B is aberration diagrams of the zoom lens according to Example 3 at an intermediate zoom position.
Figure 6C:
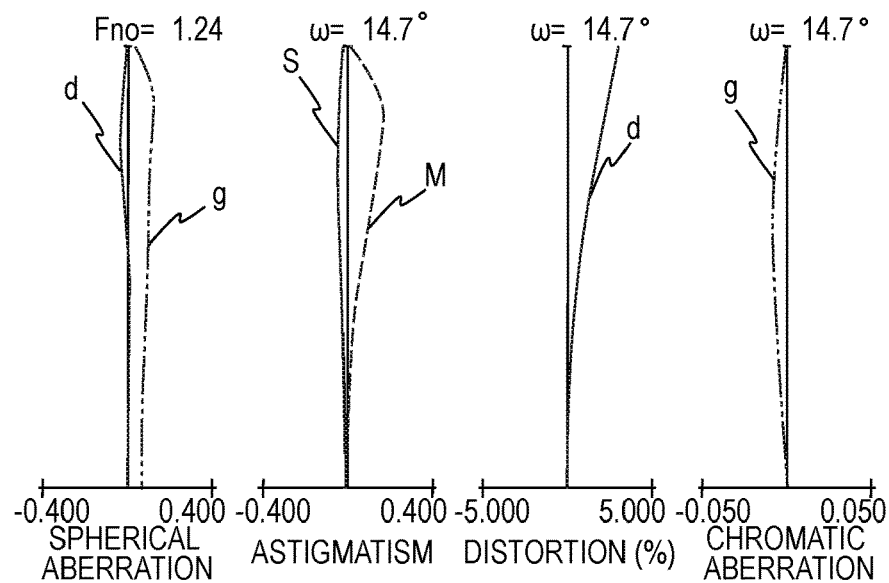
FIG. 6C is aberration diagrams of the zoom lens according to Example 3 at a telephoto end.

FIG. 1 is a lens cross-sectional view of a zoom lens according to Example 1 of the present invention at a wide angle end. FIG. 2A, FIG. 2B, and FIG. 2C are aberration diagrams of the zoom lens according to Example 1 at the wide angle end, at an intermediate zoom position, and at a telephoto end, respectively. FIG. 3 is a lens cross-sectional view of a zoom lens according to Example 2 of the present invention at a wide angle end. FIG. 4A, FIG. 4B, and FIG. 4C are aberration diagrams of the zoom lens according to Example 2 at the wide angle end, at an intermediate zoom position, and at a telephoto end, respectively. FIG. 5 is a lens cross-sectional view of a zoom lens according to Example 3 of the present invention at a wide angle end. FIG. 6A, FIG. 6B, and FIG. 6C are aberration diagrams of the zoom lens according to Example 3 at the wide angle end, at an intermediate zoom position, and at a telephoto end, respectively.

Figure 7:
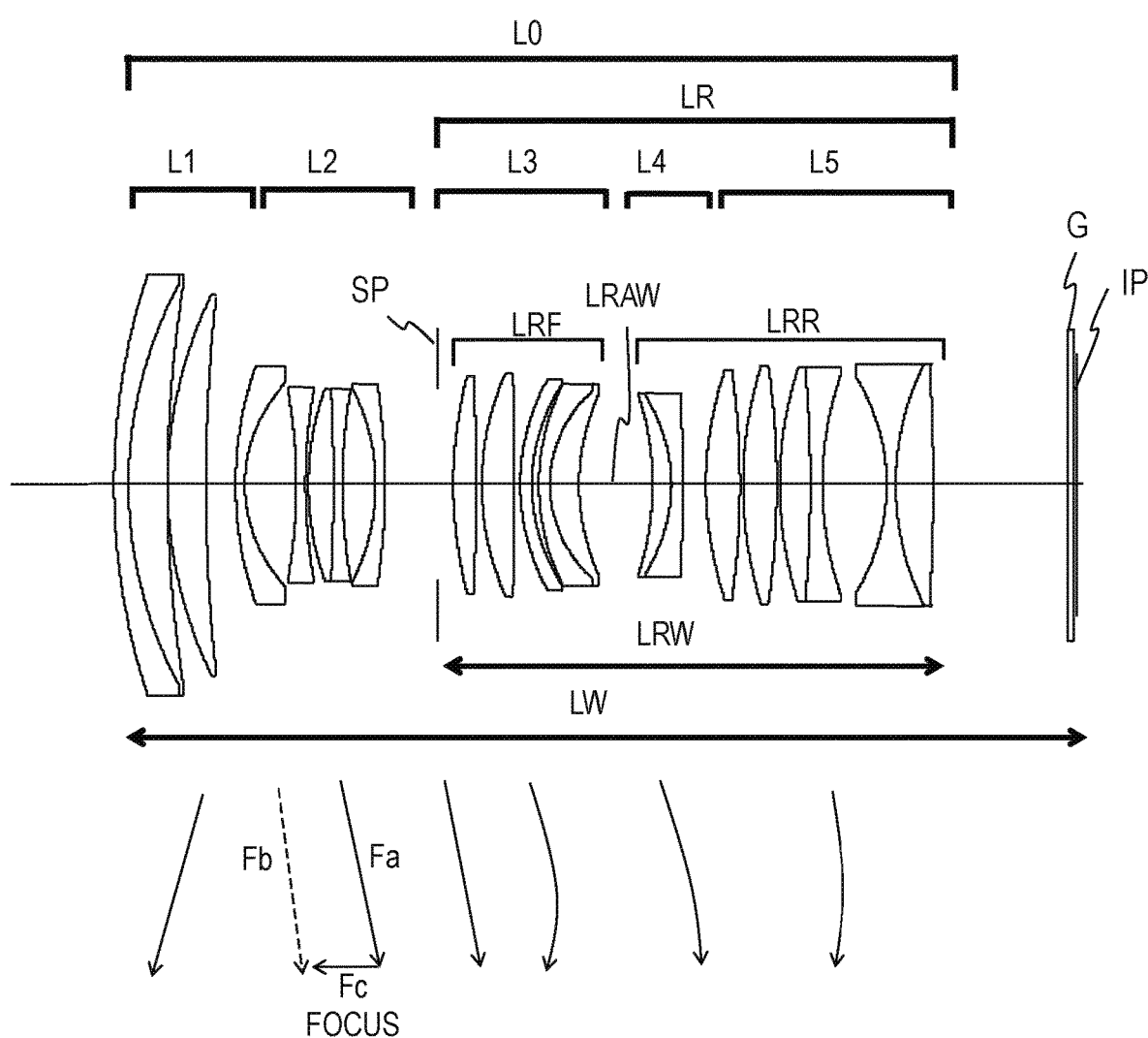
FIG. 7 is a lens cross-sectional view of a zoom lens according to Example 4 of the present invention at a wide angle end.
Figure 9:
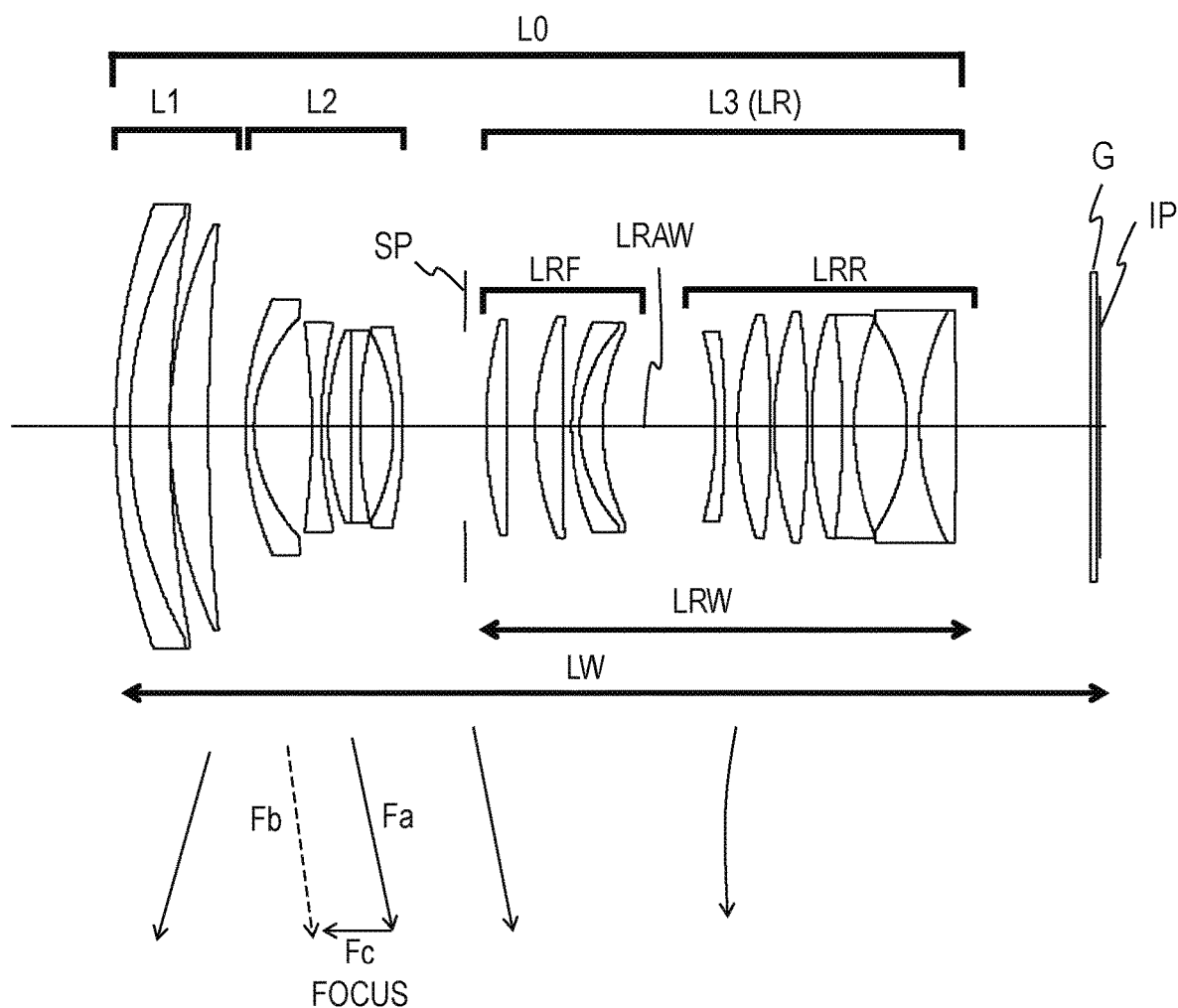
FIG. 9 is a lens cross-sectional view of a zoom lens according to Example 5 of the present invention at a wide angle end.
Figure 10A:
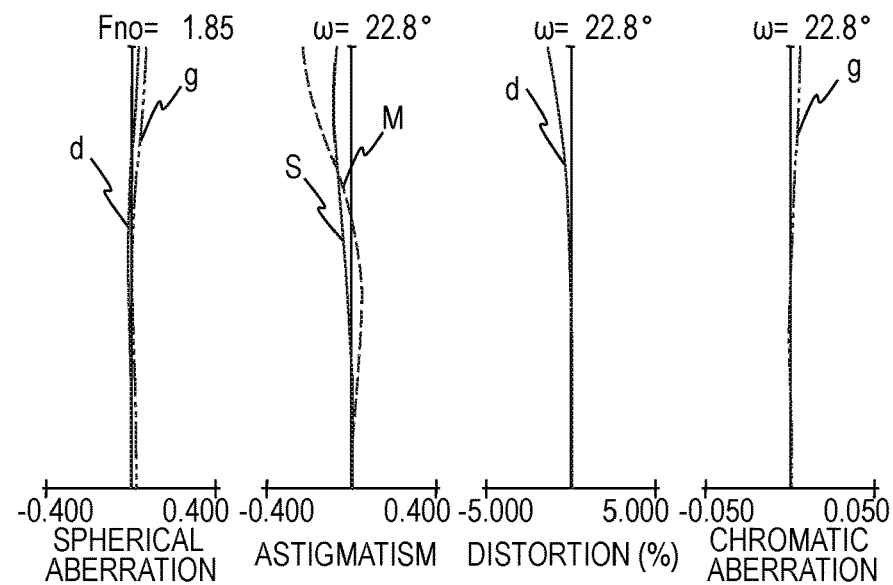
FIG. 10A is aberration diagrams of the zoom lens according to Example 5 at the wide angle end.
Figure 10B:
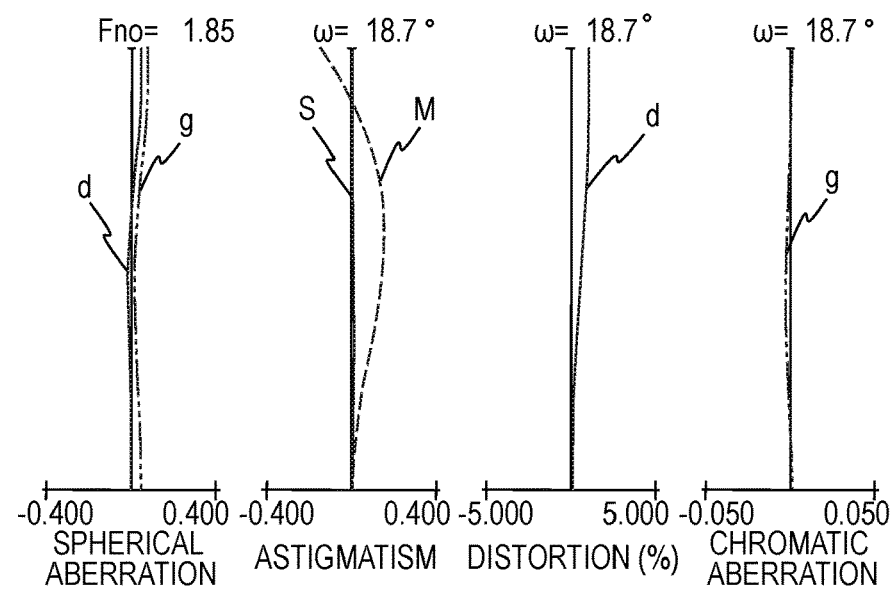
FIG. 10B is aberration diagrams of the zoom lens according to Example 5 at an intermediate zoom position.
Figure 10C:
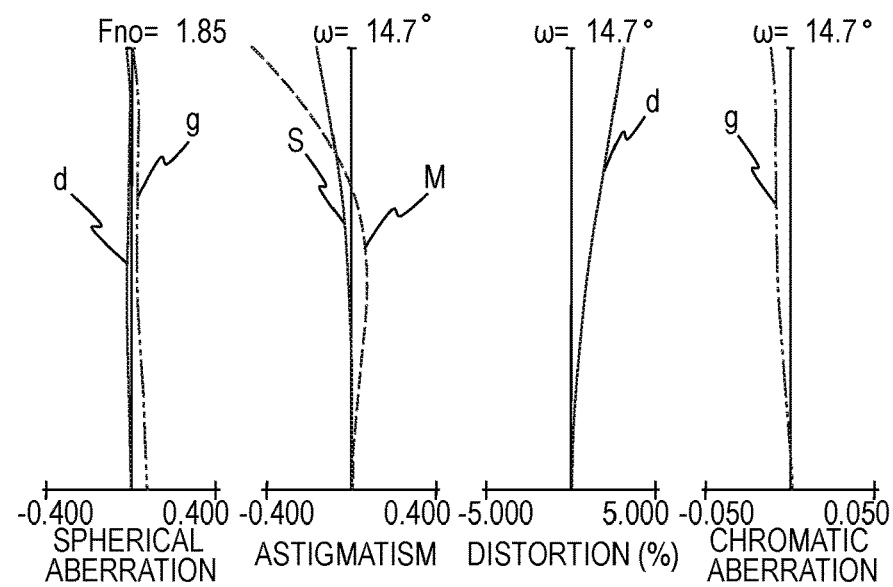
FIG. 10C is aberration diagrams of the zoom lens according to Example 5 at a telephoto end.
Figure 11:
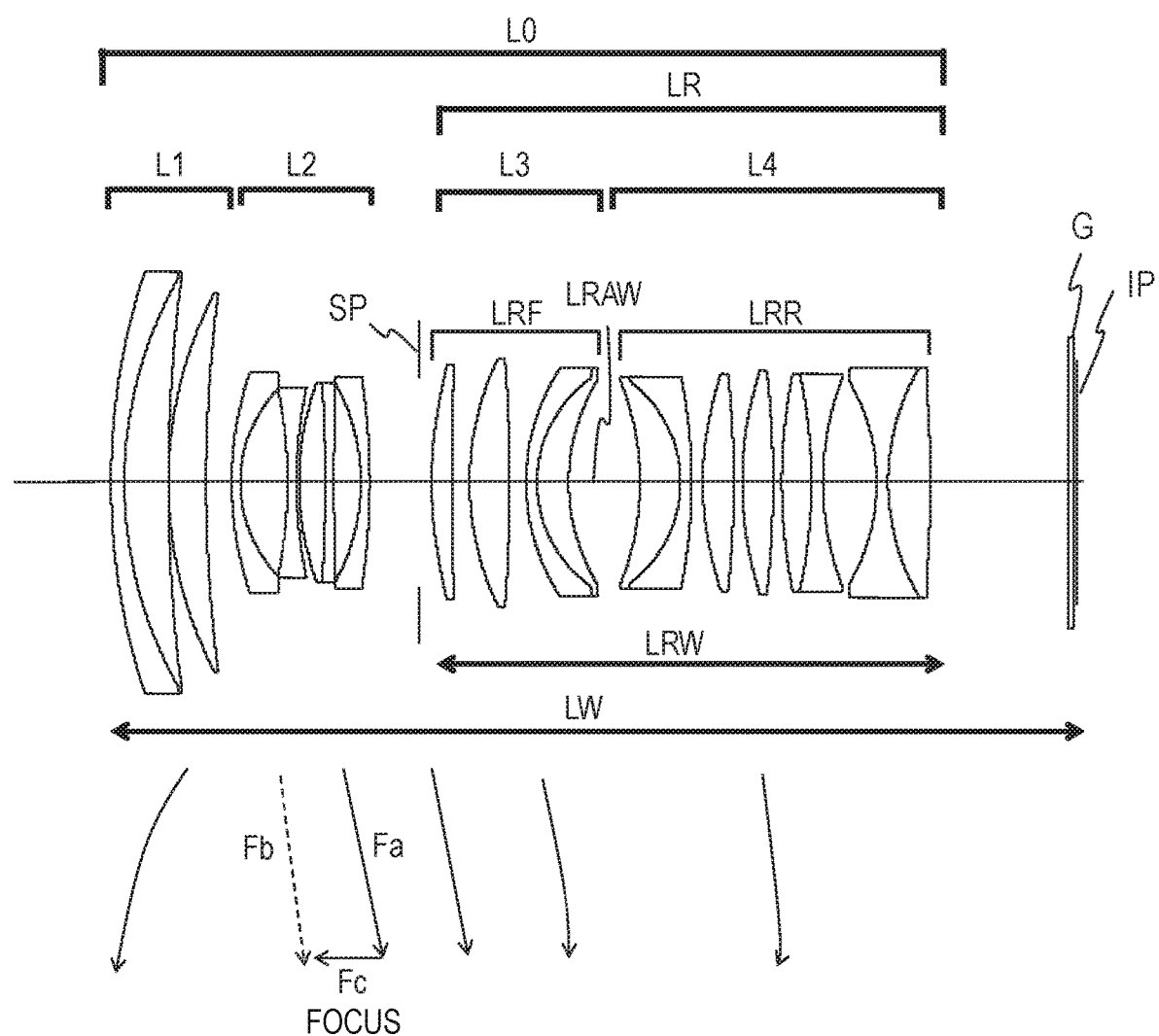
FIG. 11 is a lens cross-sectional view of a zoom lens according to Example 6 of the present invention at a wide angle end.
Figure 12A:
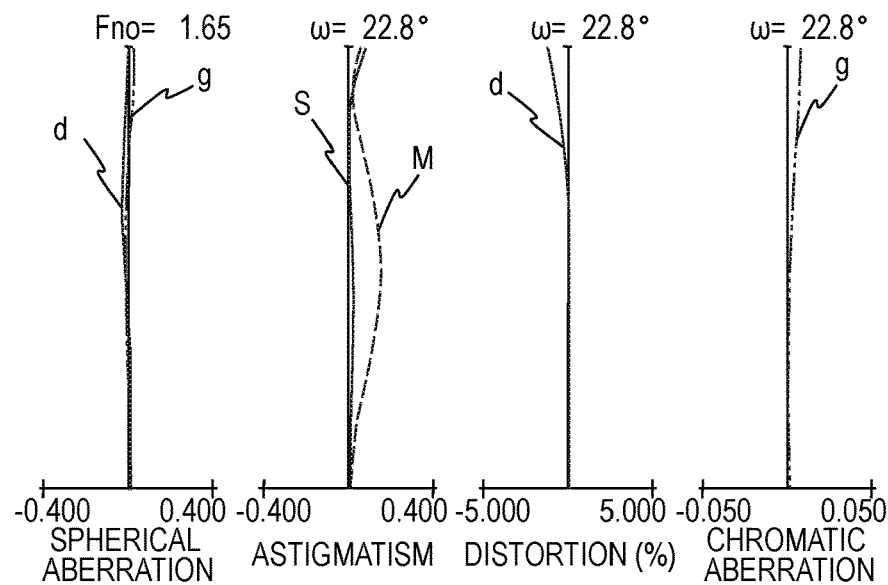
FIG. 12A is aberration diagrams of the zoom lens according to Example 6 at the wide angle end.
Figure 12B:
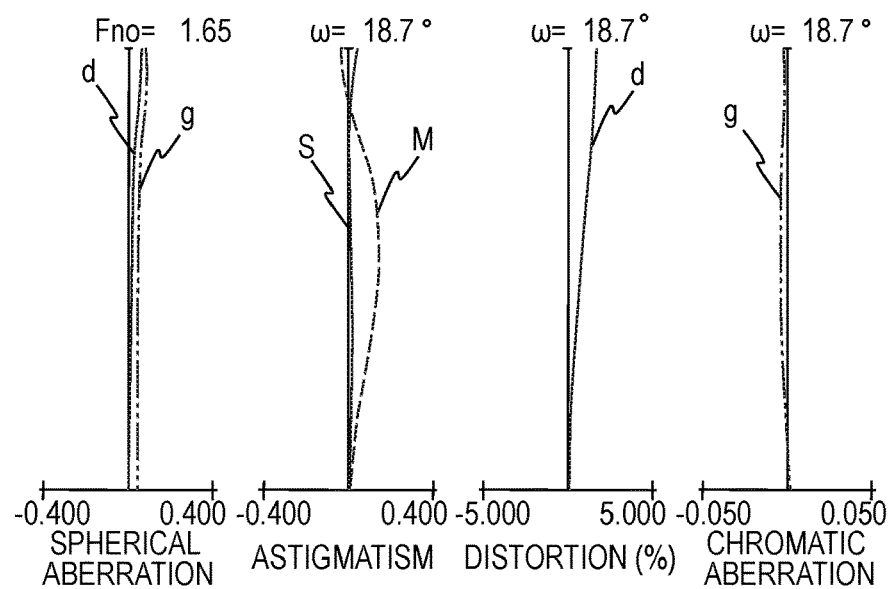
FIG. 12B is aberration diagrams of the zoom lens according to Example 6 at an intermediate zoom position.
Figure 12C:
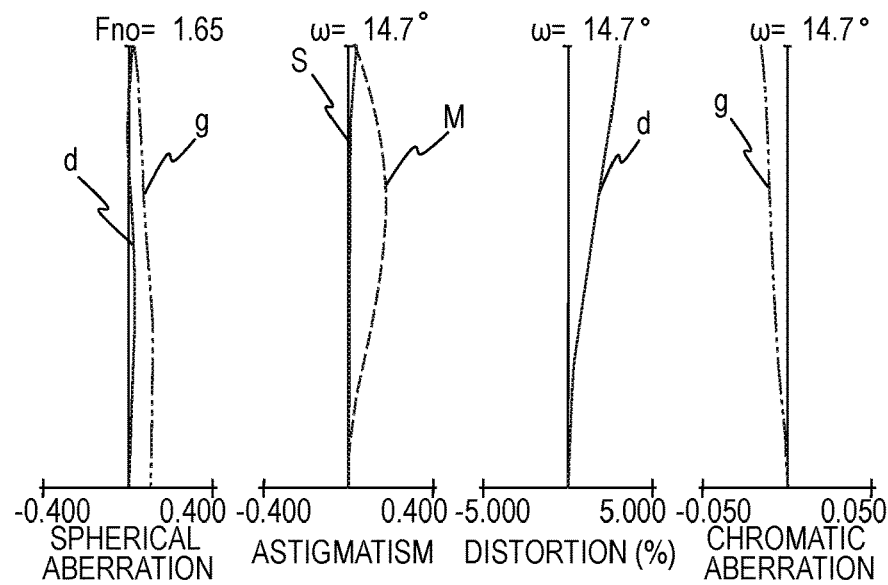
FIG. 12C is aberration diagrams of the zoom lens according to Example 6 at a telephoto end.
Figure 13:
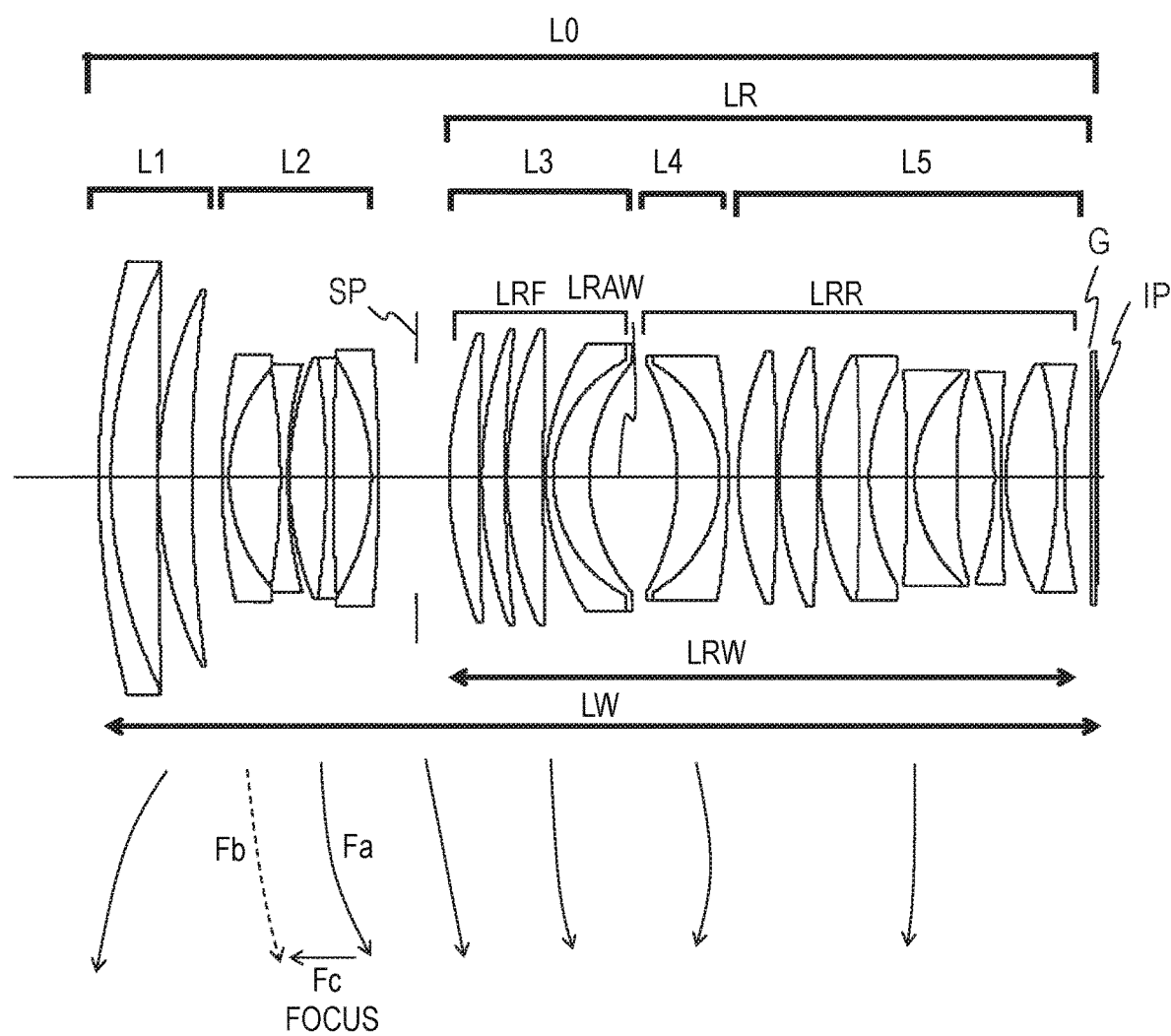
FIG. 13 is a lens cross-sectional view of a zoom lens according to Example 7 of the present invention at a wide angle end.
Figure 14A:
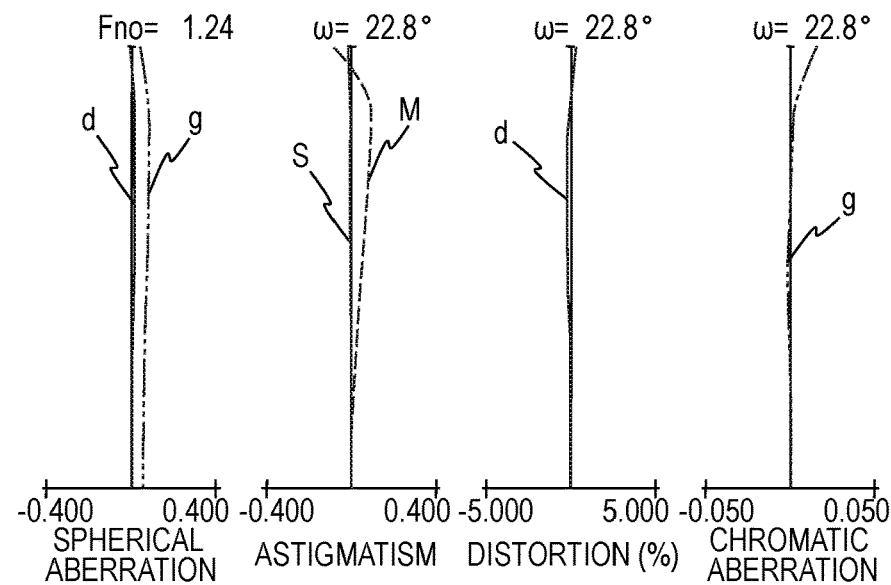
FIG. 14A is aberration diagrams of the zoom lens according to Example 7 at the wide angle end.
Figure 14B:
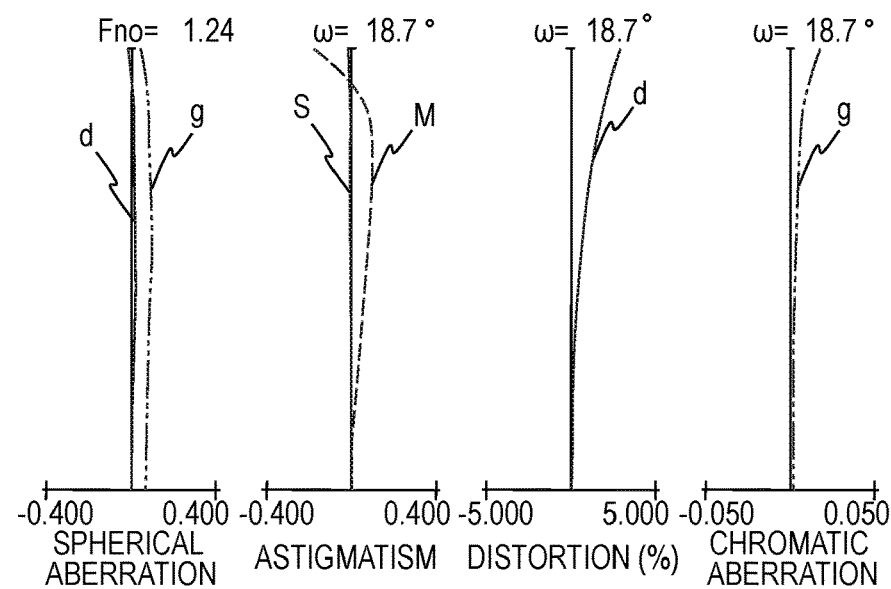
FIG. 14B is aberration diagrams of the zoom lens according to Example 7 at an intermediate zoom position.
Figure 14C:
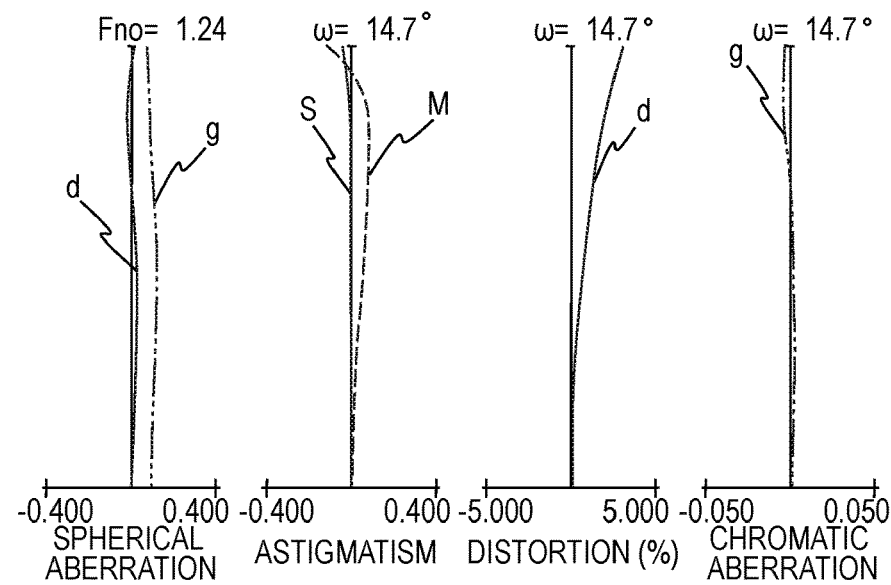
FIG. 14C is aberration diagrams of the zoom lens according to Example 7 at a telephoto end.
Figure 15:
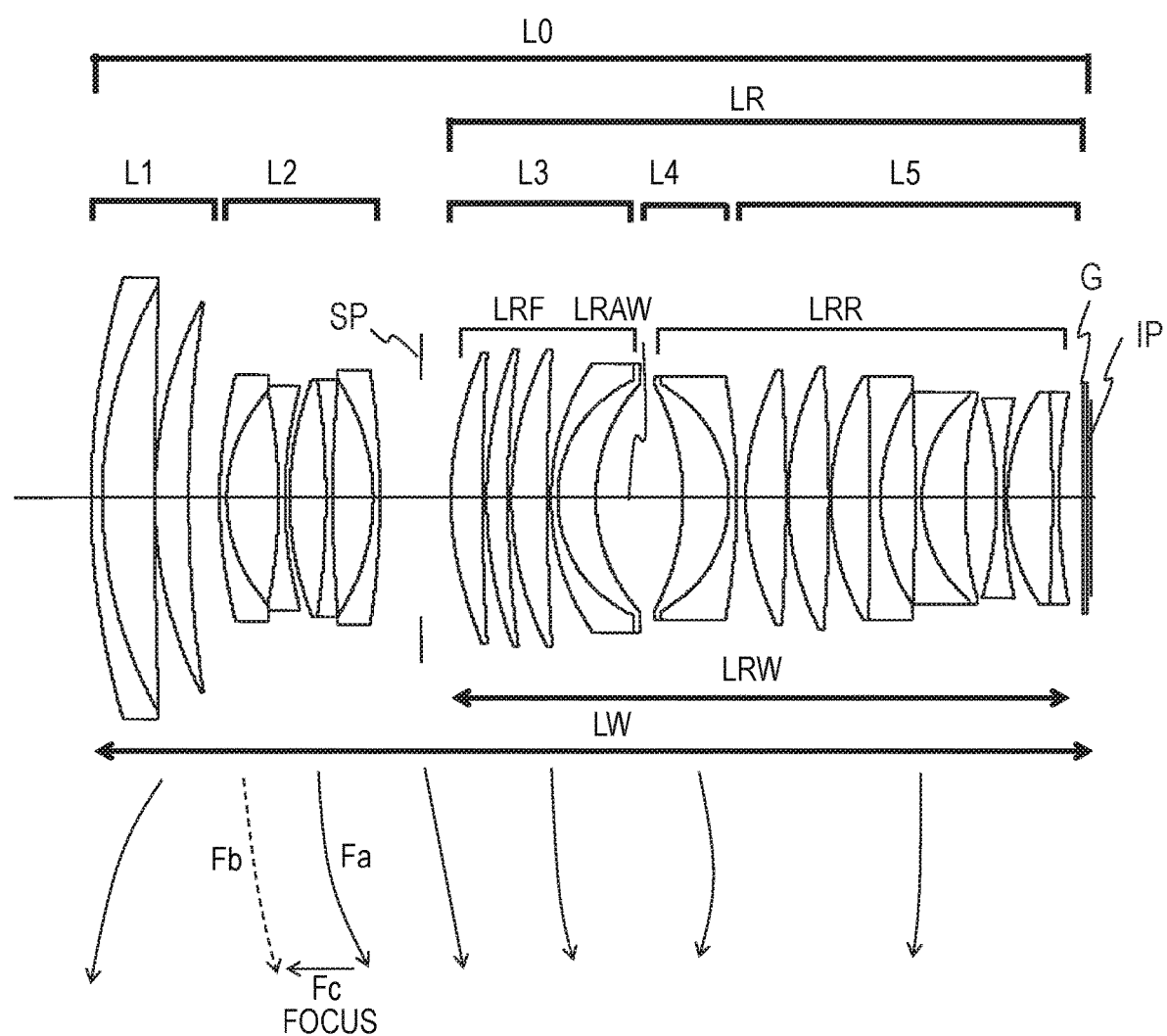
FIG. 15 is a lens cross-sectional view of a zoom lens according to Example 8 of the present invention at a wide angle end.
Figure 16A:
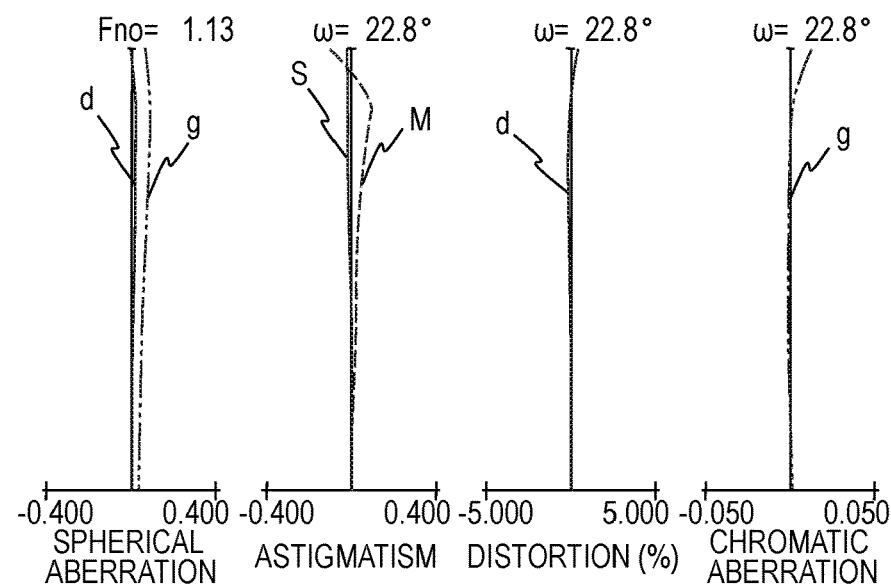
FIG. 16A is aberration diagrams of the zoom lens according to Example 8 at the wide angle end.
Figure 16B:
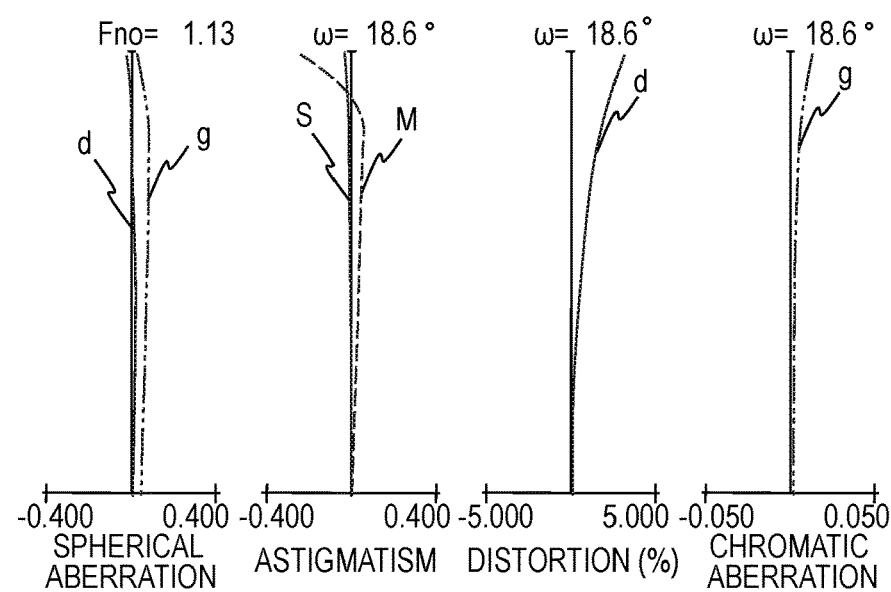
FIG. 16B is aberration diagrams of the zoom lens according to Example 8 at an intermediate zoom position.
Figure 16C:
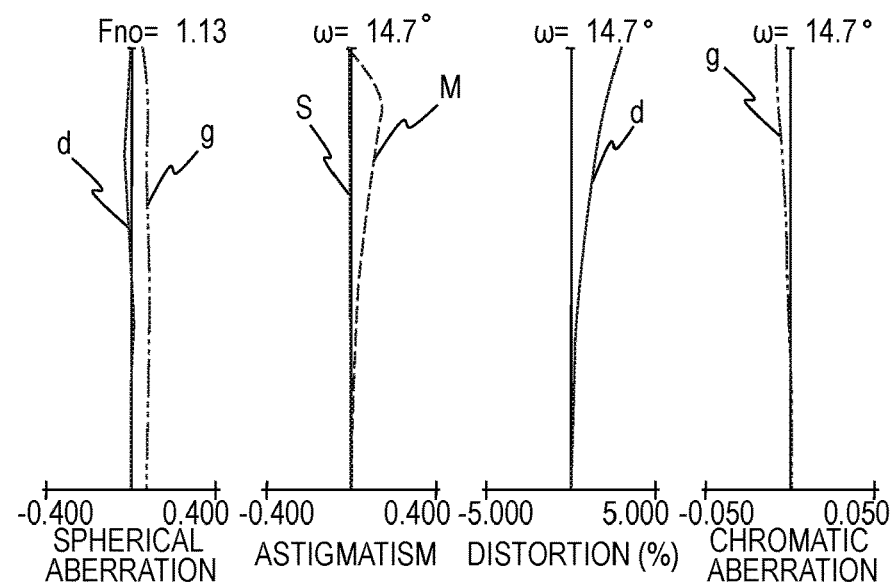
FIG. 16C is aberration diagrams of the zoom lens according to Example 8 at a telephoto end.

FIG. 7 is a lens cross-sectional view of a zoom lens according to Example 4 of the present invention at a wide angle end. FIG. 8A, FIG. 8B, and FIG. 8C are aberration diagrams of the zoom lens according to Example 4 at the wide angle end, at an intermediate zoom position, and at a telephoto end, respectively. FIG. 9 is a lens cross-sectional view of a zoom lens according to Example 5 of the present invention at a wide angle end. FIG. 10A, FIG. 10B, and FIG. 10C are aberration diagrams of the zoom lens according to Example 5 at the wide angle end, at an intermediate zoom position, and at a telephoto end, respectively. FIG. 11 is a lens cross-sectional view of a zoom lens according to Example 6 of the present invention at a wide angle end. FIG. 12A, FIG. 12B, and FIG. 12C are aberration diagrams of the zoom lens according to Example 6 at the wide angle end, at an intermediate zoom position, and at a telephoto end, respectively. FIG. 13 is a lens cross-sectional view of a zoom lens according to Example 7 of the present invention at a wide angle end. FIG. 14A, FIG. 14B, and FIG. 14C are aberration diagrams of the zoom lens according to Example 7 at the wide angle end, at an intermediate zoom position, and at a telephoto end, respectively. FIG. 15 is a lens cross-sectional view of a zoom lens according to Example 8 of the present invention at a wide angle end. FIG. 16A, FIG. 16B, and FIG. 16C are aberration diagrams of the zoom lens according to Example 8 at the wide angle end, at an intermediate zoom position, and at a telephoto end, respectively.

The zoom lens according to each Example is an image pickup optical system for use in image pickup apparatus such as a video camera, a digital camera, a monitoring camera, and a television (TV) camera.

In the lens cross-sectional views, the left side is the object side (front), and the right side is the image side (rear). In the lens cross-sectional views, the zoom lens is represented by L0. The order of a lens unit from the object side is represented by "i", and the i-th lens unit is represented by Li. A rear lens group LR includes at least one lens unit. An aperture stop is represented by SP. A glass block G is, for example, a crystal low-pass filter or an infrared cut filter.

At an image plane IP, an image pickup surface of an image pickup element (photoelectric conversion element) such as a CCD sensor or a CMOS sensor is placed when the zoom lens is used as an image pickup optical system of a video camera or a digital still camera. The arrows indicate movement loci of the respective lens units during zooming from the wide angle end to the telephoto end. The arrow relating to focus indicates a direction of movement of the lens unit during focusing from infinity to close distance.

In the lens cross-sectional views of FIG. 1, FIG. 3, FIG. 5, FIG. 7, FIG. 13, and FIG. 15, the zoom lens consists of the following lens units. Specifically, the zoom lens consists of a first lens unit L1 having a positive refractive power (refractive power is reciprocal of focal length), a second lens unit L2 having a negative refractive power, a third lens unit L3 having a positive refractive power, a fourth lens L4 unit having a negative refractive power, and a fifth lens L5 unit having a positive refractive power. A rear lens group LR consists of the third lens unit L3 to the fifth lens unit L5. An interval between each pair of adjacent lens units is changed during zooming. The second lens unit L2 is configured to move toward the object side during focusing from infinity to close distance.

In the lens cross-sectional view of FIG. 9, the zoom lens consists of a first lens unit L1 having a positive refractive power, a second lens unit L2 having a negative refractive power, and a third lens unit L3 having a positive refractive power. A rear lens group LR consists of the third lens unit L3. An interval between each pair of adjacent lens units is changed during zooming. The second lens unit L2 is configured to move toward the object side during focusing from infinity to close distance.

In the lens cross-sectional view of FIG. 11, the zoom lens consists of a first lens unit L1 having a positive refractive power, a second lens unit L2 having a negative refractive power, a third lens unit L3 having a positive refractive power, and a fourth lens unit L4 having a positive refractive power. A rear lens group LR consists of the third lens unit L3 and the fourth lens unit L4. An interval between each pair of adjacent lens units is changed during zooming. The second lens unit L2 is configured to move toward the object side during focusing from infinity to close distance.

In each Example, the aperture stop SP is arranged on the object side of the third lens unit L3. In each Example, the wide angle end and the telephoto end refer to zoom positions obtained when each lens unit is positioned at both ends in a range in which the lens unit is mechanically movable on the optical axis.

In the spherical aberration diagrams among the aberration diagrams, a solid line "d" indicates a d-line (wavelength: 587.6 nm), and a long dashed double-short dashed line "g" indicates a g-line (wavelength: 435.8 nm). In the astigmatism diagrams, a dotted line M indicates a meridional image plane at the d-line, and a solid line S indicates a sagittal image plane at the d-line. The lateral chromatic aberration at the g-line is shown. Symbol "ω" represents a half angle of view (value of half of an image pickup angle of view) (degrees), and symbol Fno represents an F-number.

Next, features of each Example are described. The zoom lens according to one embodiment of the present invention consists of, in order from an object side to an image side, a first lens unit L1 having a positive refractive power, a second lens unit L2 having a negative refractive power, and a rear lens group LR including at least one lens unit. An interval between each pair of adjacent lens units is changed during zooming.

In each Example, symbols are defined as follows. The largest full aperture F-number of the entire system of the zoom lens in zooming from the wide angle end to the telephoto end is represented by F. An interval, at the wide angle end, between a lens surface on the object side of a lens arranged closest to the object side of the rear lens group LR and a lens surface on the image side of a lens arranged closest to the image side of the rear lens group LR is represented by LRW. A total lens length of the zoom lens at the wide angle end is represented by LW. A widest lens interval having widest interval at the wide angle end among lens intervals included in the rear lens group LR is represented by LRAW.

Here, the following conditional expressions are satisfied:

$$0.70 < F < 2.50 \tag{1};$$

$$0.36 < LRW/LW < 1.00 \tag{2); and}$$

$$0.02 < LRAW/LRW < 0.30 \tag{3}.$$

Next, technical meanings of the respective conditional expressions given above are described. Conditional Expression (1) defines the largest full aperture F-number that is largest (i.e., the optical system is darkest) in the entire zoom range. When the value exceeds the upper limit value of Conditional Expression (1) and the F-number becomes larger, the zoom lens having a large aperture ratio is not achieved, which is disadvantageous. When the value falls below the lower limit value of Conditional Expression (1), it becomes difficult to obtain high optical performance.

Conditional Expression (2) defines a ratio of the thickness of the rear lens group LR in the optical axis direction to the total lens length at the wide angle end. When the ratio exceeds the upper limit value of Conditional Expression (2) and the ratio of the thickness of the rear lens group LR becomes larger, it is possible to increase the number of lenses that can be arranged in the rear lens group LR, and hence it becomes easier to obtain high optical performance. However, it becomes difficult to increase the amount of movement of each of the first lens unit L1 and the second lens unit L2, and thus it becomes difficult to obtain a predetermined zoom ratio.

In order to secure a high zoom ratio, it is required to increase the refractive powers of the first lens unit L1 and the second lens unit L2, but when the refractive powers become too stronger, an aberration variation in zooming increases. Further, when the number of lenses of each of the first lens unit L1 and the second lens unit L2 is increased in order to reduce the aberration variation, the size of the entire system of the zoom lens is disadvantageously increased.

When the ratio falls below the lower limit value of Conditional Expression (2) and the ratio of the thickness of the rear lens group LR becomes smaller, the total lens length is increased, and thus the size of the entire system of the zoom lens is disadvantageously increased. Further, when the ratio of the thickness of the rear lens group LR becomes smaller while the total lens length is kept as it is, it becomes difficult to arrange lenses, and thus it becomes difficult to secure high performance at a large aperture ratio.

Conditional Expression (3) defines a ratio of the widest air interval in the rear lens group LR to the thickness of the rear lens group LR. When the ratio exceeds the upper limit value of Conditional Expression (3) and the ratio of the widest air interval becomes larger, the number of lenses becomes insufficient, and thus it becomes difficult to achieve high performance. Further, the thickness of the rear lens group LR is increased, and hence the total lens length is disadvantageously increased. When the ratio falls below the lower limit value of Conditional Expression (3) and the ratio of the widest air interval becomes smaller, it becomes easier to achieve high performance because the number of lenses is increased, but the thickness of the rear lens group LR is disadvantageously increased.

In each Example, it is preferred to set the respective numerical ranges of Conditional Expressions (1) to (3) as follows.

$$1.10 < F < 2.20 \quad (1a);$$

$$0.43 < LRW/LW < 0.80 \quad (2a); \text{ and}$$

$$0.05 < LRAW/LRW < 0.28 \quad (3a).$$

It is more preferred to set the numerical range of Conditional Expression (2a) as follows.

$$0.45 < LRW/LW < 0.80 \quad (2a')$$

Further, it is further preferred to set the respective numerical ranges of Conditional Expressions (1a), (2a'), and (3a) as follows.

$$1.12 < F < 1.90 \quad (1b);$$

$$0.47 < LRW/LW < 0.70 \quad (2b); \text{ and}$$

$$0.12 < LRAW/LRW < 0.25 \quad (3b).$$

In each Example, with the configurations described above, it is possible to easily obtain a high-performance zoom lens in which the aperture ratio is large while the entire system of the zoom lens is downsized. In each Example, it is more preferred to satisfy at least one of the following conditions. A back focus of the zoom lens at the wide angle end is represented by BKW. The number of lenses included in the rear lens group LR is represented by N. A focal length of the first lens unit L1 is represented by f1. An interval, at the wide angle end, between the lens surface on the object side of the lens arranged closest to the object side of the rear lens group LR to the image plane is represented by LLW.

A focal length of an air lens, which is formed by a lens surface on the object side and a lens surface on the image side of the lens interval that is widest (i.e. widest lens interval) at the wide angle end among the lens intervals included in the rear lens group LR, (i.e., combined focal length of the lens surface on the object side and the lens surface on the image side) is represented by fLAW. A focal length of the rear lens group LR at the wide angle end is represented by fLRW. Curvature radii of the lens surface on the object side and the lens surface on the image side of the lens interval that is widest (i.e. widest lens interval) at the wide angle end among the lens intervals included in the rear lens group LR are represented by AR1 and AR2, respectively. A combined focal length of a front system LRF, which consists of all lenses of the rear lens group LR that are arranged on the object side of the lens interval that is widest (i.e. widest lens interval) at the wide angle end among the lens intervals included in the rear lens group LR, is represented by fLRfW.

A combined focal length of a rear system LRR, which consists of all lenses of the rear lens group LR that are arranged on the image side of the lens interval that is widest (i.e. widest lens interval) at the wide angle end among the lens intervals included in the rear lens group LR, is represented by fLReW. A focal length of the second lens unit L2 is represented by f2. The rear lens group LR includes the third lens unit L3 having a positive refractive power, which is arranged closest to the object side, and a focal length of the third lens unit L3 is represented by f3. An amount of movement of the first lens unit L1 during zooming from the wide angle end to the telephoto end is represented by M1, and an amount of movement of the second lens unit L2 during zooming from the wide angle end to the telephoto end is represented by M2.

The amount of movement of the lens unit during zooming from the wide angle end to the telephoto end herein refers to a difference between a position of the lens unit on the optical axis at the wide angle end and a position of the lens unit on the optical axis at the telephoto end. The sign of the amount of movement is positive when the lens unit is positioned closer to the image side at the telephoto end as compared to a position at the wide angle end, and is negative when the lens unit is positioned closer to the object side at the telephoto end as compared to a position at the wide angle end.

A lateral magnification of the second lens unit L2 at the telephoto end is represented by β2T. A curvature radius of a lens surface on the object side of a lens arranged closest to the image side of the second lens unit L2 is represented by RR1, and a curvature radius of a lens surface on the image side of the lens is represented by RR2. A focal length of the lens of the second lens unit L2 that is arranged closest to the image side is represented by fR.

At this time, it is preferred to satisfy at least one of the following conditional expressions.

$$0.01 < BKW/LRW < 0.40 \quad (4);$$

$$10 \leq N \leq 30 \quad (5);$$

$$0.01 < BKW/f1 < 0.35 \quad (6);$$

$$0.50 < LLW/LW < 1.00 \quad (7);$$

$$-20.00 < fLAW/fLRW < -0.10 \quad (8);$$

$$-1000.00 < (AR1-AR2)/(AR1+AR2) < -1.0 \quad (9);$$

$$-2.50 < fLAW/fLRfW < -0.25 \quad (10);$$

$$-2.50 < fLAW/fLReW < -0.25 \quad (11);$$

$$0.50 < fLRfW/fLReW < 2.00 \quad (12);$$

$$0.10 < fLRW/f1 < 1.00 \quad (13);$$

$$-3.00 < fLRW/f2 < -1.00 \quad (14).$$

$$-10.00 < f1/f2 < -2.00 \quad (15);$$

$$1.00 < f1/f3 < 5.00 \quad (16);$$

$$-1.50 < f2/f3 < -0.30 \quad (17);$$

$$-2.00 < M1/M2 < -0.05 \quad (18);$$

$$0.02 < M2/f1 < 0.50 \quad (19);$$

$$-1.00 < M1/f1 < -0.01 \quad (20);$$

$$-1.00 < \beta 2T < -0.50 \quad (21);$$

$$-1.00 < (RR1-RR2)/(RR1+RR2) < -0.20 \quad (22); \text{ and}$$

$$1.50 < fR/f2 < 5.00 \quad (23).$$

Next, technical meanings of the respective conditional expressions given above are described. Conditional Expression (4) defines a ratio of the back focus at the wide angle end to the lens thickness of the rear lens group LR at the wide angle end. When the ratio exceeds the upper limit value of Conditional Expression (4), this means that the back focus becomes longer, or the thickness of the rear lens group LR becomes shorter. When the back focus becomes longer, the total lens length is increased, or when the total lens length is kept as it is, the number of lenses of the rear lens group LR is decreased. This is advantageous in downsizing, but it becomes difficult to achieve high performance.

When the ratio falls below the lower limit value of Conditional Expression (4), this means that the back focus becomes shorter, or the thickness of the rear lens group LR is increased. When the back focus becomes shorter, it becomes easier to arrange a large number of lenses, which is advantageous in achieving high performance, but because the lens thickness of the rear lens group LR is increased, the size of the entire system of the zoom lens is disadvantageously increased.

Conditional Expression (5) defines the number of lenses included in the rear lens group LR including the third lens unit L3 and the subsequent lens units. When the value exceeds the upper limit value of Conditional Expression (5), the number of lenses included in the rear lens group LR is increased, which is advantageous in achieving high performance. However, the lens thickness of the rear lens group LR becomes too larger, and thus the size of the entire system of the zoom lens is disadvantageously increased.

When the value falls below the lower limit value of Conditional Expression (5), the number of lenses included in the rear lens group LR is decreased, which is advantageous in downsizing of the entire system of the zoom lens, but it becomes disadvantageously difficult to achieve high performance. The case in which the value falls below the lower limit value corresponds to a case in which the number of lenses included in the rear lens group LR is nine or less.

It is generally known that a Gauss-type lens consists of six lenses, but the number of lenses of nine corresponds to a configuration in which three lenses are added to the Gauss-type lens. It is known that a single lens using this Gauss-type lens and having a large aperture ratio consists of nine or less lenses. However, the number of lenses of nine or less is too small to correct sagittal flare while correcting spherical aberration and coma, and it becomes disadvantageously difficult to achieve high performance.

Conditional Expression (6) defines a ratio of the back focus at the wide angle end to the focal length of the first lens unit L1. When the ratio exceeds the upper limit value of Conditional Expression (6), this means that the back focus becomes longer, or the focal length of the first lens unit L1 becomes shorter. When the back focus becomes longer, the total lens length is increased, or when the total lens length is kept as it is, the number of lenses of the rear lens group LR is decreased, which is advantageous in downsizing of the entire system of the zoom lens, but it becomes difficult to achieve high performance.

Further, when the focal length of the first lens unit L1 becomes shorter, the total lens length becomes shorter, which is advantageous in downsizing of the entire system of the zoom lens. However, decentering sensitivity of each lens unit is increased because the focal length becomes shorter, and hence high assembly accuracy is disadvantageously required in order to achieve high performance.

When the ratio falls below the lower limit value of Conditional Expression (6), this means that the back focus becomes shorter, or the focal length of the first lens unit L1 becomes longer. When the back focus becomes shorter, it becomes easier to arrange a large number of lenses, which is advantageous in achieving high performance. However, the size of the entire system of the zoom lens is disadvantageously increased because the focal length of the first lens unit L1 becomes longer.

Conditional Expression (7) relates to the position of the rear lens group LR on the optical axis with respect to the total lens length at the wide angle end. When the ratio exceeds the upper limit value of Conditional Expression (7) and the rear lens group LR is positioned further on the object side, the number of lenses that can be arranged in the rear lens group LR can be increased, and hence it becomes easier to achieve high performance. However, it becomes difficult to increase the amount of movement of each of the first lens unit L1 and the second lens unit L2, and thus it becomes difficult to obtain a predetermined zoom ratio. When the ratio falls below the lower limit value of Conditional Expression (7) and the rear lens group LR is positioned further on the image side, the number of lenses that can be arranged in the rear lens group LR is limited, and thus it becomes disadvantageously difficult to achieve high performance.

Conditional Expression (8) defines a ratio of the focal length of the air lens, which is formed by the lens surfaces located on both sides of the maximum air interval in the rear lens group LR at the wide angle end, to the focal length of the rear lens group LR at the wide angle end. When the ratio exceeds the upper limit value of Conditional Expression (8), the focal length of the air lens becomes shorter. The rear lens group LR has a large number of lenses and has a large aperture ratio, and hence the depth of field is shallow, and it is required to optimally correct field curvature. The rear lens group LR has a strong positive refractive power, but in order to correct a Petzval sum at a large aperture ratio, the air lens is also required to be provided with a negative focal length.

When the ratio exceeds the upper limit value of Conditional Expression (8) and the negative focal length of the air lens becomes shorter, the field curvature is increased toward undercorrection, and it becomes difficult to correct the field curvature. When the ratio falls below the lower limit value of Conditional Expression (8), the negative refractive power of the air lens becomes too weaker, and thus the field curvature is disadvantageously overcorrected. Further, sagittal flare is increased, and thus it becomes difficult to correct the sagittal flare.

Conditional Expression (9) defines a shape factor (shape) of the air lens formed by the lens surfaces on both sides of the maximum air interval in the rear lens group LR at the wide angle end. When the value exceeds the upper limit value of Conditional Expression (9) and the curvature radius of the lens surface on the object side (front side) is increased, the spherical aberration is increased toward undercorrection. Further, the negative refractive power of the air lens becomes weaker, and hence the field curvature is disadvantageously undercorrected. When the value falls below the lower limit value of Conditional Expression (9) and the curvature radius of the lens surface on the object side is decreased, the spherical aberration is increased toward overcorrection. Further, the negative refractive power of the air lens becomes stronger, and hence the field curvature is disadvantageously overcorrected.

Conditional Expression (10) defines a ratio of the focal length of the air lens, which is formed by the lens surfaces on both sides of the maximum air interval in the rear lens group LR at the wide angle end, to the focal length of the front system LRF, which consists of the lenses of the rear lens group LR that are arranged on the object side of the maximum air interval in the rear lens group LR at the wide angle end.

When the ratio falls below the lower limit value of Conditional Expression (10) and the positive refractive power of the front system LRF becomes stronger, the balance among the refractive power arrangement of the front system LRF on the object side of the maximum air interval, the refractive power arrangement of the air lens of the maximum air interval, and the refractive power arrangement of the rear system LRR on the image side of the maximum air interval is lost. In this case, the spherical aberration and the field curvature are disadvantageously increased toward undercorrection. Further, when the ratio exceeds the upper limit value of Conditional Expression (10) and the positive refractive power of the front system LRF becomes weaker, the spherical aberration and the field curvature are disadvantageously increased toward overcorrection.

Conditional Expression (11) defines a ratio of the focal length of the air lens, which is formed by the lens surfaces on both sides of the maximum air interval in the rear lens group LR at the wide angle end, to the focal length of the rear system LRR, which consists of the lenses of the rear lens group LR that are arranged on the image side of the maximum air interval in the rear lens group LR at the wide angle end.

When the ratio falls below the lower limit value of Conditional Expression (11) and the positive refractive power of the rear system LRR becomes stronger, the balance among the refractive power arrangement of the front system LRF on the object side of the maximum air interval, the refractive power arrangement of the air lens of the maximum air interval, and the refractive power arrangement of the rear system LRR on the image side of the maximum air interval is lost. In this case, the spherical aberration and the field curvature are disadvantageously increased toward undercorrection. Further, when the ratio exceeds the upper limit value of Conditional Expression (11) and the positive refractive power of the rear system LRR becomes weaker, the spherical aberration and the field curvature are disadvantageously increased toward overcorrection.

Conditional Expression (12) defines a ratio of the focal length of the rear system LRR at the wide angle end to the focal length of the front system LRF at the wide angle end. When the ratio exceeds the upper limit value of Conditional Expression (12) and the entire refractive power of the lenses that are arranged on the object side of the maximum air interval becomes stronger, the spherical aberration and the field curvature are disadvantageously increased toward undercorrection. Further, when the ratio falls below the lower limit value of Conditional Expression (12) and the positive refractive power of the rear system LRR becomes weaker, the spherical aberration and the field curvature are disadvantageously increased toward overcorrection.

Conditional Expression (13) defines a ratio of the focal length of the rear lens group LR at the wide angle end to the focal length of the first lens unit L1. When the ratio exceeds the upper limit value of Conditional Expression (13), the positive refractive power of the first lens unit L1 becomes stronger, which is advantageous in reducing the total lens length. However, it becomes disadvantageously difficult to correct the aberration variation during zooming because the refractive power of the first lens unit L1 becomes too stronger. Further, when the ratio falls below the lower limit value of Conditional Expression (13) and the positive refractive power of the first lens unit L1 becomes weaker, the aberration variation is reduced, but the total lens length is disadvantageously increased.

Conditional Expression (14) defines a ratio of the focal length of the rear lens group LR at the wide angle end to the focal length of the second lens unit L2. When the ratio falls below the lower limit value of Conditional Expression (14) and the refractive power of the second lens unit L2 becomes stronger (the absolute value of the negative refractive power becomes larger), the refractive power arrangement in the zoom lens becomes advantageous in reducing the total lens length. However, it becomes difficult to suppress the aberration variation during zooming because the negative refractive power of the second lens unit L2 becomes too stronger. Further, it is required to increase the number of lenses of the second lens unit L2, and hence it is consequently required to increase the number of lenses. Thus, the size of the entire system of the zoom lens is disadvantageously increased.

Further, when the ratio exceeds the upper limit value of Conditional Expression (14) and the refractive power of the second lens unit L2 becomes weaker (the absolute value of the negative refractive power becomes smaller), the aberration variation is reduced, but the total lens length is disadvantageously increased.

Conditional Expression (15) defines a ratio of the focal length of the first lens unit L1 to the focal length of the second lens unit L2. When the ratio falls below the lower limit value of Conditional Expression (15) and the negative refractive power of the second lens unit L2 becomes stronger, the refractive power arrangement in the zoom lens becomes advantageous in reducing the total lens length, and the amount of movement during focusing from infinity to a close object point becomes advantageously smaller. However, it becomes disadvantageously difficult to suppress the aberration variation during zooming because the negative refractive power of the second lens unit L2 becomes too stronger. Further, it is required to increase the number of lenses of the second lens unit L2, and hence it is consequently required to increase the number of lenses. Thus, the size of the entire system of the zoom lens is disadvantageously increased.

When the ratio exceeds the upper limit value of Conditional Expression (15) and the negative refractive power of the second lens unit L2 becomes weaker, the amount of movement during zooming is increased, and the amount of movement during focusing is also increased. Thus, the size of the entire system of the zoom lens is disadvantageously increased.

Conditional Expression (16) defines a ratio of the focal length of the first lens unit L1 to the focal length of the third lens unit L3. When the ratio exceeds the upper limit value of Conditional Expression (16) and the positive refractive power of the first lens unit L1 becomes weaker, the total lens length is disadvantageously increased. When the ratio falls below the lower limit value of Conditional Expression (16) and the positive refractive power of the first lens unit L1 becomes stronger, the refractive power arrangement of the entire zoom lens becomes advantageous in downsizing of the zoom lens. However, the number of lenses is increased because the refractive power is increased. Consequently, the total lens length is disadvantageously increased.

Conditional Expression (17) defines a ratio of the focal length of the second lens unit L2 to the focal length of the third lens unit L3. When the ratio exceeds the upper limit value of Conditional Expression (17) and the positive refractive power of the third lens unit L3 becomes weaker, the total lens length is disadvantageously increased. When the ratio falls below the lower limit value of Conditional Expression (17) and the positive refractive power of the third lens unit L3 becomes stronger, the refractive power arrangement of the entire zoom lens becomes advantageous in downsizing of the zoom lens. However, because the refractive power is increased, the number of lenses is increased. Consequently, the total lens length is disadvantageously increased.

Conditional Expression (18) defines a ratio of the amount of movement of the first lens unit L1 to the amount of movement of the second lens unit L2 during zooming from the wide angle end to the telephoto end. When the ratio exceeds the upper limit value of Conditional Expression (18) and the amount of movement of the second lens unit L2 is increased, the total lens length is increased. Further, the negative refractive power of the second lens unit L2 becomes smaller, and the amount of movement during focusing is also increased. Thus, the aberration variation due to focusing becomes disadvantageously larger.

When the ratio falls below the lower limit value of Conditional Expression (18) and the amount of movement of the second lens unit L2 becomes smaller, it becomes difficult to secure a predetermined zoom ratio. Further, it is required to increase the negative refractive power of the second lens unit L2 in order to secure a high zoom ratio, and the number of lenses is increased because the refractive power is increased. Consequently, the total lens length is disadvantageously increased.

Conditional Expression (19) defines a ratio of the amount of movement of the second lens unit L2 to the focal length of the first lens unit L1 during zooming from the wide angle end to the telephoto end. When the ratio falls below the lower limit value of Conditional Expression (19) and the amount of movement of the second lens unit L2 becomes smaller, it becomes difficult to secure a predetermined zoom magnification. Further, it is required to increase the negative refractive power of the second lens unit L2 in order to secure a high zoom ratio, and the number of lenses is increased because the refractive power is increased. Consequently, the total lens length is disadvantageously increased.

When the ratio exceeds the upper limit value of Conditional Expression (19) and the amount of movement of the second lens unit L2 is increased, the total lens length is increased. Further, the negative refractive power of the second lens unit L2 becomes smaller, and the amount of movement during focusing is also increased. Thus, the aberration variation due to focusing becomes disadvantageously larger.

Conditional Expression (20) defines a ratio of the amount of movement of the first lens unit L1 during zooming from the wide angle end to the telephoto end to the focal length of the first lens unit L1. When the ratio exceeds the upper limit value of Conditional Expression (20) and the amount of movement of the first lens unit L1 becomes smaller, the amount of movement of the first lens unit L1 is increased in order to secure a predetermined zoom ratio, and the size of the zoom lens is increased. In another case, the positive refractive power of the first lens unit L1 becomes stronger, and the number of lenses is increased because the refractive power becomes stronger. Consequently, the total lens length is disadvantageously increased. When the ratio falls below the lower limit value of Conditional Expression (20) and the amount of movement of the first lens unit L1 is increased, the total lens length is disadvantageously increased.

Conditional Expression (21) defines the lateral magnification of the second lens unit L2 at the telephoto end. When the value exceeds the upper limit value of Conditional Expression (21) and the lateral magnification becomes smaller, the position of the second lens unit L2 on the optical axis becomes closer to the first lens unit L1, and hence unnecessary space is formed in the interval between the second lens unit L2 and the third lens unit L3. Thus, the size of the entire system of the zoom lens is disadvantageously increased. When the value falls below the lower limit value of Conditional Expression (21) and the lateral magnification becomes larger, focusing cannot be performed in some positions in zooming from the wide angle end to the telephoto end, which is disadvantageous.

Conditional Expression (22) defines a lens shape of the lens of the second lens unit L2 that is arranged closest to the image side. Conditional Expression (22) defines that the lens has a meniscus shape having a shape convex toward the image side. When the value exceeds the upper limit value of Conditional Expression (22) and the lens shape becomes such a shape that the refractive power of the meniscus shape becomes weaker, the field curvature is greatly undercorrected, which is disadvantageous. When the value falls below the lower limit value of Conditional Expression (22) and the lens shape becomes closer to a biconcave shape from the meniscus shape, the light flux emitted from the second lens unit L2 is required to be refracted sharply at the final lens, and thus the spherical aberration and the field curvature are disadvantageously overcorrected.

Conditional Expression (23) defines the refractive power of the lens of the second lens unit L2 that is arranged closest to the image side. When the value exceeds the upper limit value of Conditional Expression (23) and the negative refractive power of the lens arranged closest to the image side becomes weaker, the field curvature is greatly undercorrected, which is disadvantageous. When the value falls below the lower limit value of Conditional Expression (23) and the negative refractive power of the lens arranged closest to the image side becomes stronger, the spherical aberration and the field curvature are disadvantageously overcorrected.

In each Example, it is preferred to set the numerical ranges of Conditional Expressions (4) to (23) as follows.

$$0.02 < BKW/LRW < 0.35 \tag{4a}$$

$$10 \leq N \leq 20 \tag{5a}$$

$$0.02 < BKW/f1 < 0.30 \tag{6a}$$

$$0.56 < LLW/LRW < 0.90 \tag{7a}$$

$$-3.00 < fLAW/fLRW < -0.30 \tag{8a}$$

$$-500.00 < (AR1-AR2)/(AR1+AR2) < -1.50 \tag{9a}$$

$$-1.00 < fLAW/fLRfW < -0.35 \quad (10a);$$

$$-1.00 < fLAW/fLReW < -0.35 \quad (11a);$$

$$0.70 < fLRfW/fLReW < 1.50 \quad (12a);$$

$$0.20 < fLRW/f1 < 0.70 \quad (13a);$$

$$-2.00 < fLRW/f2 < -1.10 \quad (14a);$$

$$-5.00 < f1/f2 < -2.50 \quad (15a);$$

$$1.40 < f1/f3 < 3.00 \quad (16a);$$

$$-1.00 < f2/f3 < -0.40 \quad (17a);$$

$$-1.00 < M1/M2 < -0.10 \quad (18a);$$

$$0.05 < M2/f1 < 0.20 \quad (19a);$$

$$-0.300 < M1/f1 < -0.015 \quad (20a);$$

$$-0.98 < \mu 2T < -0.70 \quad (21a);$$

$$-0.90 < (RR1-RR2)/(RR1+RR2) < -0.30 \quad (22a); \text{ and}$$

$$2.00 < fR/f2 < 4.00 \quad (23a).$$

Further, it is further preferred to set the respective numerical ranges of Conditional Expressions (4a) to (23a) as follows.

$$0.04 < BKW/LRW < 0.31 \quad (4b);$$

$$11 \leq N \leq 16 \quad (5b);$$

$$0.05 < BKW/f1 < 0.28 \quad (6b);$$

$$0.61 < LLW/LRW < 0.80 \quad (7b);$$

$$-1.10 < fLAW/fLRW < -0.60 \quad (8b);$$

$$-20.00 < (AR1-AR2)/(AR1+AR2) < -3.00 \quad (9b);$$

$$-0.80 < fLAW/fLRfW < -0.50 \quad (10b);$$

$$-0.70 < fLAW/fLReW < -0.45 \quad (11b);$$

$$0.78 < fLRfW/fLReW < 1.05 \quad (12b);$$

$$0.35 < fLRW/f1 < 0.55 \quad (13b);$$

$$-1.70 < fLRW/f2 < -1.20 \quad (14b);$$

$$-3.70 < f1/f2 < -3.20 \quad (15b);$$

$$1.60 < f1/f3 < 2.60 \quad (16b);$$

$$-0.80 < f2/f3 < -0.45 \quad (17b);$$

$$-0.75 < M1/M2 < -0.15 \quad (18b);$$

$$0.090 < M2/f1 < 0.150 \quad (19b);$$

$$-0.100 < M1/f1 < -0.020 \quad (20b);$$

$$-0.97 < \beta 2T < -0.80 \quad (21b);$$

$$-0.80 < (RR1-RR2)/(RR1+RR2) < -0.35 \quad (22b); \text{ and}$$

$$2.30 < fR/f2 < 3.00 \quad (23b).$$

In each Example, with the configuration of each element described above, a high-performance zoom lens in which the entire system of the zoom lens is downsized while the aperture ratio is large is obtained.

In order to achieve high performance in the entire zoom range at a large aperture ratio, it is preferred that the first lens unit L1 consist of at least three lenses. When the number of lenses of the first lens unit L1 is less than three, it becomes difficult to correct spherical aberration and aberration of an off-axial ray, and it becomes difficult to increase the positive refractive power of the first lens unit L1.

When the positive refractive power of the first lens unit L1 becomes weaker, the negative refractive power of the second lens unit L2 consequently becomes weaker, and hence the amount of movement of the second lens unit L2 during focusing is increased. When the amount of movement due to focusing is increased, it becomes difficult to suppress the aberration variation due to focusing. Specifically, it is preferred that the first lens unit L1 consist of, in order from the object side to the image side, a negative lens, a positive lens, and a positive lens.

It is preferred that the second lens unit L2 consist of at least five lenses. The second lens unit L2 is a lens unit for performing focusing, and it is required to suppress the aberration variation due to focusing, but when the number of lenses is small, it becomes difficult to suppress the aberration variation. Specifically, it is preferred that the second lens unit L2 consist of, in order from the object side to the image side, a negative lens, a negative lens, a positive lens, a negative lens, and a negative lens.

In the lens arrangement of the second lens unit L2, the positive lens is arranged at the center, and the refractive power arrangement and shape arrangement that are symmetrical with respect to the positive lens on the object side and the image side are adopted. With this arrangement, a variation of optical performance exhibited when the second lens unit L2 is moved for focusing is reduced. Further, the negative lens of the second lens unit L2 that is arranged closest to the image side has a meniscus shape having a shape convex toward the image side. Thus, a central light flux is gently refracted to be emitted from the second lens unit L2 to the third lens unit L3, in which the central light flux is the widest, to thereby suitably correct the spherical aberration.

It is preferred that the air lens, which is formed by the lens surfaces on the object side and the image side of the largest lens interval among the lens intervals formed in the rear lens group LR including the third lens unit L3 and the subsequent lens units, have a negative refractive power. In the lens configuration of the rear lens group LR including the third lens unit L3 and the subsequent lens units, in order to downsize the entire system of the zoom lens and achieve high performance, the air interval between each pair of lenses is small, and a large number of lenses are arranged.

In order to suitably correct the field curvature in this lens configuration, it is preferred that the air lens be provided with a strong negative refractive power. In the rear lens group LR including the third lens unit L3 and the subsequent lens units, a total refractive power of the front system LRF consisting of the lenses arranged on the object side of the largest lens interval is a positive refractive power, and a total refractive power of the rear system LRR consisting of the lenses arranged on the image side of the largest lens interval is a positive refractive power.

In the entire rear lens group LR, the refractive power arrangement of a so-called triplet lens consisting of the front system LRF having a positive refractive power, the air lens having a negative refractive power, and the rear system LRR having a positive refractive power is adopted. With this arrangement, for example, spherical aberration, coma, field curvature, and chromatic aberration are suitably corrected by the entire rear lens group LR.

Next, a lens configuration of each Example is described. The zoom lens of Example 1 consists of the following lens units arranged in order from the object side to the image side. Specifically, the zoom lens consists of the first lens unit L1 having a positive refractive power, the second lens unit L2 having a negative refractive power, the aperture stop SP, the third lens unit L3 having a positive refractive power, the fourth lens unit L4 having a negative refractive power, and the fifth lens unit L5 having a positive refractive power. The rear lens group LR consists of the third lens unit L3 to the fifth lens unit L5.

The zoom lens of Example 1 is a zoom lens in which a zoom ratio is about 1.6, the focal length of the entire system at the wide angle end is, in terms of a 35 mm film-equivalent focal length (the same applies hereinafter), the standard focal length range of about 51.50 mm, and the focal length of the entire system of the zoom lens at the telephoto end is the medium telephoto focal length range of 82.52 mm. The zoom lens of Example 1 has a positive lead-type lens configuration including, in order from the object side to the image side, the first lens unit L1 having a positive refractive power and the second lens unit L2 having a negative refractive power.

During zooming from the wide angle end to the telephoto end, the first lens unit L1 moves toward the object side, the second lens unit L2 moves toward the image side, and the aperture stop SP moves toward the image side independently of other lens units (along a different locus). The third lens unit L3 moves toward the image side, the fourth lens unit L4 moves toward the object side (along a locus convex toward the image side), and the fifth lens unit L5 moves toward the object side. The first lens unit L1 moves toward the object side, and the second lens unit L2 moves toward the image side, to thereby increase a magnification-varying effect.

The F-number is as small as 1.44 in the entire zoom range, and the depth of field is extremely shallow, and hence the number of lenses of the lens units of the rear lens group LR including the third lens unit L3 and the subsequent lens units is increased. In particular, through adoption of the lens configuration using 14 lenses, in which the number of lenses is increased on the basis of a Gauss-type lens having a large aperture ratio, and through selection of an optimal material, the image plane is suitably corrected, and the spherical aberration, the coma, and the chromatic aberration are also suitably corrected, for example.

Through the arrangement of lenses by reducing the interval between lens units among the third lens unit L3 and the subsequent lens units and the interval between lenses included in each lens unit, various aberrations are suitably corrected, and further, the thickness of the rear lens group LR including the third lens unit L3 and the subsequent lens units is reduced. The air lens, which is formed by the largest air interval among the lens intervals between the lenses of the third lens unit L3 and the subsequent lens units, is an air lens having a negative focal length (refractive power). In the rear lens group LR, in which lenses are arranged at short intervals, a Petzval sum is corrected by the air lens having a negative focal length to suitably correct the field curvature.

Further, as compared to an image pickup optical system to be used in a single-lens reflex camera (image pickup apparatus) having a quick return mirror arranged therein, there is adopted a configuration with a shorter back focus in which a lens is arranged closer to the image pickup element, at which the quick return mirror is to be arranged. With this configuration, various aberrations due to the increase in the number of lenses are suitably corrected.

In order to support a shallow depth of field in the entire zoom range, respective lens units of the rear lens group LR including the third lens unit L3 and the subsequent lens units are configured to move along different loci during zooming by an amount smaller than the amount of movement of the second lens unit L2, to thereby correct variations of various aberrations during zooming.

In the rear lens group LR including the third lens unit L3 and the subsequent lens units, in order to downsize the zoom lens and correct various aberrations due to the increase in aperture ratio, the interval between each pair of lenses is smaller, and thus the lenses are arranged at short intervals. Moreover, in order to support a large aperture ratio, a lens outer diameter is large, and thus the rear lens group LR becomes heavier. Accordingly, it is difficult to perform focusing by the lenses of the third lens unit L3 and the subsequent lens units. Thus, focusing is performed by the second lens unit L2, in which the effective diameter is small in the lens system and it is thus easy to secure air intervals on the front and rear sides of the second lens unit L2.

As described above, in Example 1, there are arranged the first lens unit L1 having a positive refractive power, the second lens unit L2 having a negative refractive power, and the rear lens group LR on the image side of the second lens unit L2 having a negative refractive power, in which the number of lenses is large, and which is based on the lens configuration of a Gauss-type lens having a large aperture ratio. Further, in order to downsize the entire system of the zoom lens, the air intervals in the rear lens group LR are minimized, and the configuration with a short back focus, in which a lens is arranged also at a position close to the image pickup element, is adopted. Further, in order to achieve zooming with a small total lens length, the ratio of the thickness of the lens units of the rear lens group LR including the third lens unit L3 and the subsequent lens units to the total lens length is appropriately set.

In the zoom lens of Example 2, the number of lens units and the sign of the refractive power of each lens unit are the same as those of Example 1. The zoom lens of Example 2 is a zoom lens in which a zoom ratio is about 1.6, the focal length of the entire system of the zoom lens at the wide angle end is the standard focal length range of about 51.50 mm, and the focal length of the entire system of the zoom lens at the telephoto end is the medium telephoto focal length range of 82.52 mm.

During zooming from the wide angle end to the telephoto end, the first lens unit L1 moves toward the object side, the second lens unit L2 moves toward the image side, and the aperture stop SP moves toward the image side. The third lens unit L3 moves toward the image side, the fourth lens unit L4 moves toward the object side along a locus convex toward the image side, and the fifth lens unit L5 moves toward the object side. The first lens unit L1 moves toward the object side, and the second lens unit L2 moves toward the image side, to thereby increase a magnification-varying effect.

The F-number is as small as 1.44 in the entire zoom range, and the depth of field is extremely shallow, and hence the number of lenses of the lens units of the rear lens group LR including the third lens unit L3 and the subsequent lens units is increased. In particular, through adoption of the configuration using 16 lenses, in which the number of lenses is increased on the basis of a Gauss-type lens having a large aperture ratio, and further through selection of an optimal material, the image plane is suitably corrected, and the spherical aberration, the coma, and the chromatic aberration are also suitably corrected, for example.

The lens configuration, effects, and others of the rear lens group LR including the third lens unit L3 and the subsequent lens units are the same as those of Example 1. The configuration for focusing is also the same as that of Example 1.

In the zoom lens of Example 3, the number of lens units and the sign of the refractive power of each lens unit are the same as those of Example 1. The zoom lens of Example 3 is a zoom lens in which a zoom ratio is about 1.6, the focal length of the entire system of the zoom lens at the wide angle end is the standard focal length range of about 51.50 mm, and the focal length of the entire system of the zoom lens at the telephoto end is the medium telephoto focal length range of 82.52 mm.

During zooming from the wide angle end to the telephoto end, the first lens unit L1 moves toward the object side, the second lens unit L2 moves toward the image side, and the aperture stop SP moves toward the image side independently. The third lens unit L3 moves toward the image side, the fourth lens unit L4 moves toward the object side, and the fifth lens unit L5 moves toward the object side. The first lens unit L1 moves toward the object side, and the second lens unit L2 moves toward the image side, to thereby increase a magnification-varying effect.

The F-number is as small as 1.24 in the entire zoom range, and the depth of field is extremely shallow, and hence the number of lenses of the lens units of the rear lens group LR including the third lens unit L3 and the subsequent lens units is increased. In particular, through adoption of the configuration using 14 lenses, in which the number of lenses is increased on the basis of a Gauss-type lens having a large aperture ratio, and further through selection of an optimal material, the image plane is suitably corrected, and the spherical aberration, the coma, and the chromatic aberration are also suitably corrected, for example. The lens configuration, effects, and others of the rear lens group LR including the third lens unit L3 and the subsequent lens units are the same as those of Example 1. The configuration for focusing is also the same as that of Example 1.

In the zoom lens of Example 4, the number of lens units and the sign of the refractive power of each lens unit are the same as those of Example 1. The zoom lens of Example 4 is a zoom lens in which a zoom ratio is about 1.6, the focal length of the entire system of the zoom lens at the wide angle end is the standard focal length range of about 51.50 mm, and the focal length of the entire system of the zoom lens at the telephoto end is the medium telephoto focal length range of 82.52 mm.

During zooming from the wide angle end to the telephoto end, the first lens unit L1 moves toward the object side, the second lens unit L2 moves toward the image side, and the aperture stop SP moves toward the image side independently. The third lens unit L3 moves toward the image side, the fourth lens unit L4 moves along a locus convex toward the image side, and the fifth lens unit L5 moves along a locus convex toward the image side. The first lens unit L1 moves toward the object side, and the second lens unit L2 moves toward the image side, to thereby increase a magnification-varying effect.

The F-number is as small as 1.85 in the entire zoom range, and the depth of field is extremely shallow, and hence a large number of lenses of the lens units of the rear lens group LR including the third lens unit L3 and the subsequent lens units are arranged. Further, through adoption of the configuration using 13 lenses, in which the number of lenses is increased on the basis of a Gauss-type lens having a large aperture ratio, and further through selection of an optimal material, the image plane is suitably corrected, and the spherical aberration, the coma, and the chromatic aberration are also suitably corrected, for example. The lens configuration, effects, and others of the rear lens group LR including the third lens unit L3 and the subsequent lens units are the same as those of Example 1. The configuration for focusing is also the same as that of Example 1.

The zoom lens of Example 5 consists of the following lens units arranged in order from the object side to the image side. Specifically, the zoom lens consists of the first lens unit L1 having a positive refractive power, the second lens unit L2 having a negative refractive power, the aperture stop SP, and the third lens unit L3 having a positive refractive power. The rear lens group LR consists of the third lens unit L3.

The zoom lens of Example 5 is a zoom lens in which a zoom ratio is about 1.6, the focal length of the entire system at the wide angle end is the standard focal length range of 51.50 mm, and the focal length of the entire system of the zoom lens at the telephoto end is the medium telephoto focal length range of 82.52 mm. The zoom lens of Example 5 has a positive lead-type lens configuration including, in order from the object side to the image side, the first lens unit L1 having a positive refractive power and the second lens unit L2 having a negative refractive power.

During zooming from the wide angle end to the telephoto end, the first lens unit L1 moves toward the object side, the second lens unit L2 moves toward the image side, and the aperture stop SP moves toward the image side independently. The third lens unit L3 moves toward the object side. The first lens unit L1 moves toward the object side, and the second lens unit L2 moves toward the image side, to thereby increase a magnification-varying effect.

The F-number is as small as 1.85 in the entire zoom range, and the depth of field is extremely shallow. Thus, a large number of lenses are arranged in the third lens unit L3, and the configuration using 11 lenses, in which the number of lenses is increased on the basis of a Gauss-type lens having a large aperture ratio, is adopted. Through the selection of an optimal glass material, the image plane is suitably corrected, and the spherical aberration, the coma, and the chromatic aberration are also suitably corrected.

Through the arrangement of lenses by reducing the interval between lenses of the third lens unit L3, various aberrations are suitably corrected, and further, the thickness of the third lens unit L3 is reduced. The air lens, which is formed by the largest air interval among the lens intervals between the lenses of the third lens unit L3, is an air lens having a negative focal length. In the rear lens group LR, in which lenses are arranged at short intervals, a Petzval sum is corrected by the air lens having the negative focal length to suitably correct the field curvature.

Further, as compared to an image pickup optical system to be used in a single-lens reflex camera (image pickup apparatus) having a quick return mirror arranged therein, there is adopted a configuration with a shorter back focus in which a lens is arranged closer to the image pickup element, at which the quick return mirror is to be arranged. With this configuration, various aberrations due to the increase in the number of lenses are suitably corrected.

The front system LRF consisting of the lenses arranged on the object side of the widest air interval (maximum air interval) among the intervals included in the rear lens group LR and the rear system LRR consisting of the lenses arranged on the image side of the widest air interval each have a positive refractive power. That is, the refractive power arrangement of the rear lens group LR is a so-called triplet lens arrangement consisting of, in order from the object side to the image side, the front system LRF having a positive refractive power, the air lens having a negative refractive power, which forms the maximum air interval, and the rear system LRR having a positive refractive power. With this arrangement, the spherical aberration and the field curvature are suitably corrected.

A solid line Fa illustrated in the lens cross-sectional views indicates a movement locus during zooming of the second lens unit L2 at infinity, and a dotted line Fb indicates a movement locus during zooming of the second lens unit L2 at the closest distance. During focusing from infinity to the closest distance, the second lens unit L2 moves toward the object side as indicated by an arrow Fc.

In the third lens unit L3, in order to downsize the entire system of the zoom lens and correct various aberrations due to the increase in aperture ratio, the interval between each pair of lenses is smaller, and thus the lenses are arranged at short intervals. Moreover, in order to support a large aperture ratio, a lens outer diameter is large, and thus the third lens unit L3 becomes heavier. Accordingly, it is difficult to perform focusing by the lenses of the third lens unit L3. Thus, focusing is performed by the second lens unit L2, in which the effective diameter is small in the lens system and it is thus easy to secure air intervals on the front and rear sides of the second lens unit L2.

As described above, in Example 5, there are arranged the first lens unit L1 having a positive refractive power, the second lens unit L2 having a negative refractive power, and the third lens unit L3 on the image side of the second lens unit L2 having a negative refractive power, in which the number of lenses is large, and which is based on the lens configuration of a Gauss-type lens having a large aperture ratio. Further, in order to downsize the entire system of the zoom lens, the air intervals in the third lens unit L3 are minimized, and the configuration with a short back focus, in which a lens is arranged also at a position close to the image pickup element, is adopted. Further, in order to achieve zooming with a small total lens length, the ratio of the thickness of the third lens unit L3 to the total lens length is appropriately set.

The zoom lens of Example 6 consists of the following lens units arranged in order from the object side to the image side. Specifically, the zoom lens consists of the first lens unit L1 having a positive refractive power, the second lens unit L2 having a negative refractive power, the aperture stop SP, the third lens unit L3 having a positive refractive power, and the fourth lens unit L4 having a positive refractive power.

The zoom lens of Example 6 is a zoom lens in which a zoom ratio is about 1.6, the focal length of the entire system at the wide angle end is the standard focal length range of about 51.50 mm, and the focal length of the entire system of the zoom lens at the telephoto end is the medium telephoto focal length range of 82.52 mm. The zoom lens of Example 6 has a positive lead-type lens configuration including, in order from the object side to the image side, the first lens unit L1 having a positive refractive power and the second lens unit L2 having a negative refractive power.

During zooming from the wide angle end to the telephoto end, the first lens unit L1 moves toward the object side, the second lens unit L2 moves toward the image side, and the aperture stop SP moves toward the image side independently. The third lens unit L3 moves toward the image side, the fourth lens unit L4 moves toward the image side. The first lens unit L1 moves toward the object side, and the second lens unit L2 moves toward the image side, to thereby increase a magnification-varying effect.

The F-number is as small as 1.65 in the entire zoom range, and the depth of field is extremely shallow, and hence a large number of lenses of the lens units of the rear lens group LR including the third lens unit L3 and the subsequent lens unit are arranged. In particular, through adoption of the lens configuration using 12 lenses, in which the number of lenses is increased on the basis of a Gauss-type lens having a large aperture ratio, and further through selection of an optimal material, the image plane is suitably corrected, and the spherical aberration, the coma, and the chromatic aberration are also suitably corrected, for example.

Through the arrangement of lenses by reducing the interval between lens units among the third lens unit L3 and the subsequent lens unit and the interval between lenses included in each lens unit, various aberrations are suitably corrected, and further, the thickness of the third lens unit L3 and the thickness of the subsequent lens unit are reduced. The air lens, which is formed by the largest air interval among the lens intervals between the lenses of the third lens unit L3 and the subsequent lens unit, is an air lens having a negative focal length. In the rear lens group LR, in which lenses are arranged at short intervals, a Petzval sum is corrected by the air lens having a negative focal length to suitably correct the field curvature.

Further, as compared to an image pickup optical system to be used in a single-lens reflex camera (image pickup apparatus) having a quick return mirror arranged therein, there is adopted a configuration with a shorter back focus in which a lens is arranged closer to the image pickup element, at which the quick return mirror is to be arranged. With this configuration, various aberrations due to the increase in the number of lenses are corrected.

The front system LRF consisting of the lenses arranged on the object side of the widest air interval (maximum air interval) among the intervals included in the rear lens group LR and the rear system LRR consisting of the lenses arranged on the image side of the widest air interval each have a positive refractive power. That is, the refractive power arrangement of the rear lens group LR is a so-called triplet lens arrangement consisting of, in order from the object side to the image side, the front system LRF having a positive refractive power, the air lens having a negative refractive power, which forms the maximum air interval, and the rear system LRR having a positive refractive power. With this arrangement, the spherical aberration and the field curvature are suitably corrected.

In order to support a shallow depth of field in the entire zoom range, respective lens units of the rear lens group LR including the third lens unit L3 and the subsequent lens unit are configured to move along different loci during zooming by an amount smaller than the amount of movement of the second lens unit L2, to thereby correct variations of various aberrations during zooming.

The solid line Fa illustrated in the lens cross-sectional views indicates a movement locus during zooming of the second lens unit L2 at infinity, and a dotted line Fb indicates a movement locus during zooming of the second lens unit L2 at the closest distance. During focusing from infinity to the closest distance, the second lens unit L2 moves toward the object side as indicated by the arrow Fc.

In the rear lens group LR including the third lens unit L3 and the subsequent lens unit, in order to downsize the zoom lens and correct various aberrations due to the increase in aperture ratio, the interval between each pair of lenses is smaller, and thus the lenses are arranged at short intervals. Moreover, in order to support a large aperture ratio, a lens outer diameter is large, and thus the rear lens group LR becomes heavier. Accordingly, it is difficult to perform focusing by the lenses of the third lens unit L3 and the subsequent lens unit. Thus, focusing is performed by the second lens unit L2, in which the effective diameter is small in the lens system and it is thus easy to secure air intervals on the front and rear sides of the second lens unit L2.

As described above, in Example 6, there are arranged the first lens unit L1 having a positive refractive power, the second lens unit L2 having a negative refractive power, and the rear lens group LR on the image side of the second lens unit L2 having a negative refractive power, in which the number of lenses is large, and which is based on the lens configuration of a Gauss-type lens having a large aperture ratio. Further, in order to downsize the entire system of the zoom lens, the air intervals in the rear lens group LR are minimized, and the configuration with a short back focus, in which a lens is arranged also at a position close to the image pickup element, is adopted. Further, in order to achieve zooming with a small total lens length, the ratio of the thickness of the lens units of the rear lens group LR including the third lens unit L3 and the subsequent lens unit to the total lens length is appropriately set.

In the zoom lens of Example 7, the number of lens units and the sign of the refractive power of each lens unit are the same as those of Example 1. The zoom lens of Example 7 is a zoom lens in which a zoom ratio is about 1.6, the focal length of the entire system of the zoom lens at the wide angle end is the standard focal length range of about 51.50 mm, and the focal length of the entire system of the zoom lens at the telephoto end is the medium telephoto focal length range of 82.50 mm.

During zooming from the wide angle end to the telephoto end, the first lens unit L1 moves toward the object side, the second lens unit L2 moves toward the image side, and the aperture stop SP moves toward the image side independently. The third lens unit L3 moves toward the image side, the fourth lens unit L4 moves toward the object side, and the fifth lens unit L5 moves toward the object side. The first lens unit L1 moves toward the object side, and the second lens unit L2 moves toward the image side, to thereby increase a magnification-varying effect.

The F-number is as small as 1.24 in the entire zoom range, and the depth of field is extremely shallow, and hence the number of lenses of the lens units of the rear lens group LR including the third lens unit L3 and the subsequent lens units is increased. In particular, through adoption of the configuration using 16 lenses, in which the number of lenses is increased on the basis of a Gauss-type lens having a large aperture ratio, and further through selection of an optimal material, the image plane is suitably corrected, and the spherical aberration, the coma, and the chromatic aberration are also suitably corrected, for example. The lens configuration, effects, and others of the rear lens group LR including the third lens unit L3 and the subsequent lens units are the same as those of Example 1. The configuration for focusing is also the same as that of Example 1.

In the zoom lens of Example 8, the number of lens units and the sign of the refractive power of each lens unit are the same as those of Example 1. The zoom lens of Example 8 is a zoom lens in which a zoom ratio is about 1.6, the focal length of the entire system of the zoom lens at the wide angle end is the standard focal length range of about 51.50 mm, and the focal length of the entire system of the zoom lens at the telephoto end is the medium telephoto focal length range of 82.52 mm.

During zooming from the wide angle end to the telephoto end, the first lens unit L1 moves toward the object side, the second lens unit L2 moves toward the image side along a locus convex, and the aperture stop SP moves toward the image side independently. The third lens unit L3 moves toward the image side, the fourth lens unit L4 moves toward the object side, and the fifth lens unit L5 moves toward the object side. The first lens unit L1 moves toward the object side, and the second lens unit L2 moves toward the image side, to thereby increase a magnification-varying effect.

The F-number is as small as 1.13 in the entire zoom range, and the depth of field is extremely shallow, and hence the number of lenses in the lens units of the rear lens group LR including the third lens unit L3 and the subsequent lens units is increased. In particular, through adoption of the configuration using 16 lenses, in which the number of lenses is increased on the basis of a Gauss-type lens having a large aperture ratio, and further through selection of an optimal material, the image plane is suitably corrected, and the spherical aberration, the coma, and the chromatic aberration are also suitably corrected, for example. The lens configuration, effects, and others of the rear lens group LR including the third lens unit L3 and the subsequent lens units are the same as those of Example 1. The configuration for focusing is also the same as that of Example 1.

Figure 17:
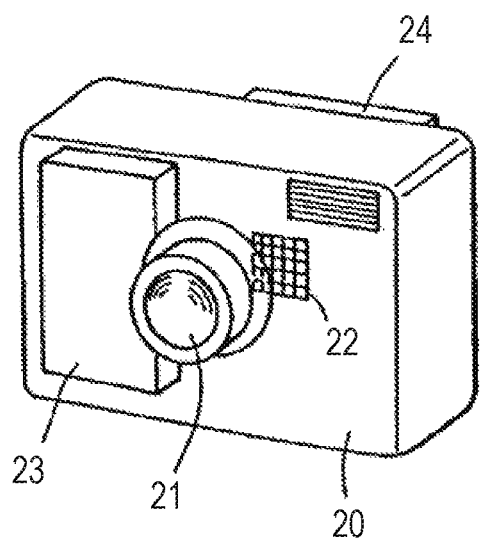
FIG. 17 is a schematic view of a main part of an image pickup apparatus according to one embodiment of the present invention.

Next, a digital camera (image pickup apparatus) according to an Embodiment of the present invention, which uses the zoom lens according to one embodiment of the present invention as an image pickup optical system, is described with reference to FIG. 17. In FIG. 17, the digital camera includes a digital camera main body 20, and an image pickup optical system 21 including the zoom lens of one of Examples described above. The digital camera further includes an image pickup element 22, for example, a CCD, which is configured to receive light of an object image formed by the image pickup optical system 21, a recording unit 23 configured to record data on the object image received by the image pickup element 22, and a finder 24 to be used to observe the object image displayed on a display element (not shown).

The display element described above includes, for example, a liquid crystal panel. The object image formed on the image pickup element 22 is displayed on the display element. The digital camera further includes a liquid crystal display panel 24 having a function equivalent to that of the finder. An image pickup apparatus having a small size and high optical performance is implemented by applying the zoom lens according to one embodiment of the present invention to the image pickup apparatus, for example, a digital camera, in such a manner.

The zoom lens of each Example is used as an image pickup optical system of an image pickup apparatus such as an interchangeable lens, a video camera, a digital still camera, a broadcasting camera, and a monitoring camera.

Exemplarily embodiments of the present invention are described above, but the present invention is not limited to those embodiments and can be modified and changed variously within the scope of the gist thereof.

Next, Numerical Data 1 to 8 corresponding to Examples 1 to 8, respectively, are described. In each of Numerical Data, symbol "i" represents the order of a surface counted from the object side, symbol "ri" represents a curvature radius of an i-th lens surface, symbol "di" represents a lens thickness or an air gap between an i-th surface and the (i+1)th surface, and symbols "ndi" and "vdi" represent a refractive index and an Abbe number of a material of a lens between the i-th surface and the (i+1)th surface at the d-line, respectively.

Further, an aspherical shape is represented as follows:

$$x=(h^2/R)/[1+[1-(1-k)(h/R)^2]^{1/2}]+A4h^4+A6h^6+A8h^8,$$

where R represents a paraxial curvature radius, "k" represents an eccentricity, A4, A6, and A8 represent aspherical coefficients, and "x" represents a displacement in the optical axis direction from a surface vertex at a position of a height "h" from the optical axis. The notation "e-x" means "$10^{-x}$".

In each of Examples, back focus (BF) corresponds to an air-equivalent distance from a lens final surface to a paraxial image plane. A total lens length is a value obtained by adding the back focus to a distance from a lens surface closest to the object side to the final lens surface. Moreover, correspondence between values of the conditional expressions given above and parameters relating to those values in each of Examples is shown in Table 1.

[Numerical Data 1]

Unit: mm

Surface data

| Surface number | r | d | nd | vd |
|---|---|---|---|---|
| 1 | 163.440 | 2.40 | 1.95906 | 17.5 |
| 2 | 90.597 | 7.40 | 1.77250 | 49.6 |
| 3 | 408.158 | 0.00 | | |
| 4 | 76.201 | 7.20 | 1.81600 | 46.6 |
| 5 | 265.380 | (Variable) | | |
| 6 | 77.176 | 1.50 | 1.77250 | 49.6 |
| 7 | 27.938 | 8.98 | | |
| 8* | −102.266 | 1.50 | 1.76802 | 49.2 |
| 9 | 81.421 | 0.79 | | |
| 10 | 57.432 | 6.00 | 2.00069 | 25.5 |
| 11 | −208.040 | 1.50 | 1.53775 | 74.7 |
| 12 | 231.249 | 6.95 | | |
| 13* | −39.288 | 1.50 | 1.69680 | 55.5 |
| 14 | −156.054 | (Variable) | | |
| 15 (Stop) | ∞ | (Variable) | | |
| 16* | 73.223 | 4.60 | 1.55332 | 71.7 |
| 17 | 780.306 | 1.37 | | |
| 18 | 71.409 | 5.55 | 1.59282 | 68.6 |
| 19 | 661.624 | 1.37 | | |
| 20 | 65.543 | 5.40 | 1.77250 | 49.6 |
| 21 | 272.708 | 1.37 | | |
| 22 | 48.085 | 1.50 | 1.68893 | 31.1 |
| 23 | 25.575 | 5.45 | 1.49700 | 81.6 |
| 24 | 34.391 | (Variable) | | |
| 25 | −49.560 | 7.80 | 1.58913 | 61.1 |
| 26 | −25.533 | 1.70 | 1.59551 | 39.2 |
| 27 | −188.746 | (Variable) | | |
| 28* | 57.717 | 7.10 | 1.59201 | 67.0 |
| 29 | −214.972 | 0.55 | | |
| 30 | 54.747 | 7.10 | 1.59282 | 68.6 |
| 31 | −214.972 | 0.55 | | |
| 32 | 84.487 | 5.00 | 1.59282 | 68.6 |
| 33 | −209.144 | 2.00 | 1.68893 | 31.1 |
| 34 | 54.247 | 6.65 | | |
| 35 | −91.295 | 1.50 | 1.51633 | 64.1 |
| 36 | 37.833 | 6.10 | 1.83441 | 37.3 |
| 37* | −3,954.375 | 6.58 | | |
| 38 | −54.803 | 1.50 | 1.49700 | 81.6 |
| 39 | −78.387 | (Variable) | | |
| 40 | ∞ | 1.00 | 1.51633 | 64.1 |
| 41 | ∞ | 0.50 | | |
| Image plane | ∞ | | | |

Aspherical surface data

Eighth surface

K = 0.00000e+000   A4 = 9.21915e−007   A6 = 9.32780e−010
A8 = −8.04793e−013

Thirteenth surface

K = 0.00000e+000   A4 = −3.32346e−007   A6 = 1.96818e−010
A8 = 1.46577e−012

Sixteenth surface

K = 0.00000e+000   A4 = −1.34969e−006   A6 = 1.18804e−011

Twenty-eighth surface

K = 0.00000e+000   A4 = −8.56213e−007   A6 = 5.21869e−010
A8 = −3.56416e−013

Thirty-seventh surface

K = 0.00000e+000   A4 = 5.54560e−006   A6 = 7.17392e−010

Various data
Zoom ratio 1.60

| | Wide angle | Intermediate | Telephoto |
|---|---|---|---|
| Focal length | 51.50 | 64.32 | 82.52 |
| F-number | 1.44 | 1.44 | 1.44 |
| Half angle of view (degrees) | 22.79 | 18.59 | 14.69 |
| Total lens length | 184.33 | 189.76 | 191.68 |
| BF | 25.27 | 25.92 | 26.54 |
| d5 | 4.55 | 14.32 | 24.22 |
| d14 | 8.27 | 6.20 | 0.48 |
| d15 | 3.19 | 1.31 | 1.00 |
| d24 | 14.57 | 15.20 | 11.83 |
| d27 | 2.02 | 0.36 | 1.14 |
| d39 | 24.11 | 24.76 | 25.38 |

Lens unit data

| Unit | First surface | Focal length |
|---|---|---|
| 1 | 1 | 104.35 |
| 2 | 6 | −29.07 |
| 3 | 16 | 54.30 |
| 4 | 25 | −114.00 |
| 5 | 28 | 44.18 |

[Numerical Data 2]

Unit: mm

Surface data

| Surface number | r | d | nd | vd |
|---|---|---|---|---|
| 1 | 136.550 | 2.40 | 1.95906 | 17.5 |
| 2 | 82.420 | 8.40 | 1.77250 | 49.6 |
| 3 | 435.501 | 0.00 | | |
| 4 | 77.739 | 7.00 | 1.77250 | 49.6 |
| 5 | 273.326 | (Variable) | | |
| 6 | 84.248 | 1.50 | 1.77250 | 49.6 |
| 7 | 28.142 | 8.94 | | |
| 8* | −90.669 | 1.50 | 1.76802 | 49.2 |
| 9 | 87.233 | 0.86 | | |
| 10 | 58.479 | 6.25 | 2.00069 | 25.5 |
| 11 | −186.220 | 1.50 | 1.49700 | 81.5 |
| 12 | 215.401 | 6.61 | | |
| 13* | −40.818 | 1.50 | 1.69680 | 55.5 |
| 14 | −159.734 | (Variable) | | |
| 15 (Stop) | ∞ | (Variable) | | |
| 16* | 74.016 | 4.80 | 1.55332 | 71.7 |
| 17 | 13,775.291 | 1.61 | | |
| 18 | 73.418 | 4.20 | 1.59282 | 68.6 |
| 19 | 235.646 | 1.61 | | |
| 20 | 61.509 | 5.70 | 1.77250 | 49.6 |
| 21 | 373.230 | 1.61 | | |
| 22 | 47.649 | 1.50 | 1.68893 | 31.1 |
| 23 | 24.782 | 5.40 | 1.49700 | 81.5 |
| 24 | 33.654 | (Variable) | | |
| 25 | −48.733 | 7.55 | 1.58913 | 61.1 |
| 26 | −24.782 | 1.70 | 1.59551 | 39.2 |
| 27 | −196.977 | (Variable) | | |
| 8* | 57.717 | 7.10 | 1.59201 | 67.0 |
| 29 | −218.911 | 0.55 | | |
| 30 | 58.328 | 7.10 | 1.59201 | 67.0 |

-continued

Unit: mm

| | | | | |
|---|---|---|---|---|
| 31 | −218.911 | 0.55 | | |
| 32 | 69.416 | 5.50 | 1.59201 | 67.0 |
| 33 | −319.378 | 2.00 | 1.66680 | 33.0 |
| 34 | 52.070 | 7.49 | | |
| 35 | −102.282 | 1.50 | 1.52249 | 59.8 |
| 36 | 36.308 | 6.10 | 1.83400 | 37.2 |
| 37* | 552.137 | 8.80 | | |
| 38 | −49.994 | 1.50 | 1.66680 | 33.0 |
| 39 | −208.166 | 0.97 | | |
| 40 | 78.693 | 8.30 | 1.60562 | 43.7 |
| 41 | −63.066 | 1.50 | 1.51633 | 64.1 |
| 42 | 277.396 | (Variable) | | |
| 43 | ∞ | 1.00 | 1.51633 | 64.1 |
| 44 | ∞ | 0.50 | | |
| Image plane | ∞ | | | |

Aspherical surface data

Eighth surface

K = 0.00000e+000    A4 = 8.81861e−007    A6 = 8.45247e−010
A8 = −3.70489e−013

Thirteenth surface

K = 0.00000e+000    A4 = −4.84529e−007    A6 = 1.33865e−010
A8 = 9.54661e−013

Sixteenth surface

K = 0.00000e+000    A4 = −1.30323e−006    A6 = −7.81336e−012

Twenty-eighth surface

K = 0.00000e+000    A4 = −8.22066e−007    A6 = 3.77698e−010
A8 = −2.78172e−013

Thirty-seventh surface

K = 0.00000e+000    A4 = 5.15475e−006    A6 = 6.40324e−010

Various data
Zoom ratio 1.60

| | Wide angle | Intermediate | Telephoto |
|---|---|---|---|
| Focal length | 51.50 | 64.25 | 82.52 |
| F-number | 1.44 | 1.44 | 1.44 |
| Half angle of view (degrees) | 22.79 | 18.61 | 14.69 |
| Total lens length | 187.84 | 192.11 | 192.52 |
| BF | 12.38 | 12.49 | 13.61 |
| d5 | 5.20 | 14.54 | 22.75 |
| d14 | 8.27 | 5.75 | 0.49 |
| d15 | 4.18 | 2.61 | 1.00 |
| d24 | 14.59 | 14.74 | 12.47 |
| d27 | 2.08 | 0.84 | 1.05 |
| d42 | 11.22 | 11.33 | 12.45 |

Lens unit data

| Unit | First surface | Focal length |
|---|---|---|
| 1 | 1 | 99.10 |
| 2 | 6 | −28.94 |
| 3 | 16 | 54.47 |
| 4 | 25 | −109.60 |
| 5 | 28 | 43.38 |

[Numerical Data 3]

Unit: mm

Surface data

| Surface number | r | d | nd | vd |
|---|---|---|---|---|
| 1 | 186.962 | 2.40 | 1.95906 | 17.5 |
| 2 | 99.362 | 8.60 | 1.77250 | 49.6 |
| 3 | 729.699 | 0.00 | | |
| 4 | 80.468 | 7.70 | 1.81600 | 46.6 |
| 5 | 273.022 | (Variable) | | |
| 6 | 97.947 | 1.50 | 1.77250 | 49.6 |
| 7 | 31.694 | 10.79 | | |
| 8* | −107.893 | 1.50 | 1.76802 | 49.2 |
| 9 | 77.396 | 0.39 | | |
| 10 | 62.380 | 7.20 | 2.00069 | 25.5 |
| 11 | −216.953 | 1.50 | 1.53775 | 74.7 |
| 12 | −1,156.680 | 7.15 | | |
| 13* | −42.716 | 1.50 | 1.69680 | 55.5 |
| 14 | −212.080 | (Variable) | | |
| 15 (Stop) | ∞ | (Variable) | | |
| 16* | 77.626 | 3.95 | 1.55332 | 71.7 |
| 17 | 215.852 | 0.51 | | |
| 18 | 77.847 | 6.30 | 1.59282 | 68.6 |
| 19 | 536.408 | 0.51 | | |
| 20 | 63.948 | 6.95 | 1.77250 | 49.6 |
| 21 | 263.635 | 0.51 | | |
| 22 | 54.243 | 1.50 | 1.68893 | 31.1 |
| 23 | 28.924 | 6.39 | 1.49700 | 81.6 |
| 24 | 38.262 | (Variable) | | |
| 25 | −49.084 | 8.70 | 1.58913 | 61.1 |
| 26 | −28.891 | 1.70 | 1.59551 | 39.2 |
| 27 | −152.588 | (Variable) | | |
| 28* | 57.717 | 9.75 | 1.59201 | 67.0 |
| 29 | −230.931 | 0.50 | | |
| 30 | 53.547 | 9.75 | 1.59282 | 68.6 |
| 31 | −230.931 | 0.50 | | |
| 32 | 87.266 | 7.10 | 1.59282 | 68.6 |
| 33 | −119.420 | 2.00 | 1.68893 | 31.1 |
| 34 | 65.920 | 5.99 | | |
| 35 | −189.489 | 1.50 | 1.51633 | 64.1 |
| 36 | 42.538 | 4.40 | 1.83441 | 37.3 |
| 37* | 221.096 | 5.07 | | |
| 38 | −84.150 | 1.50 | 1.49700 | 81.6 |
| 39 | −278.097 | (Variable) | | |
| 40 | ∞ | 1.00 | 1.51633 | 64.1 |
| 41 | ∞ | 0.50 | | |
| Image plane | ∞ | | | |

Aspherical surface data

Eighth surface

K = 0.00000e+000    A4 = 9.66616e−007    A6 = 6.29524e−010
A8 = −3.81156e−014

Thirteenth surface

K = 0.00000e+000    A4 = −3.01704e−007    A6 = −1.56616e−011
A8 = 7.34040e−013

Sixteenth surface

K = 0.00000e+000    A4 = −1.09088e−006    A6 = 1.65206e−011

Twenty-eighth surface

K = 0.00000e+000    A4 = −9.95975e−007    A6 = 1.83945e−010
A8 = −2.36210e−013

Thirty-seventh surface

K = 0.00000e+000    A4 = 5.60872e−006    A6 = 1.67454e−009

Various data
Zoom ratio 1.60

| | Wide angle | Intermediate | Telephoto |
|---|---|---|---|
| Focal length | 51.50 | 64.01 | 82.52 |
| F-number | 1.24 | 1.24 | 1.24 |
| Half angle of view (degrees) | 22.79 | 18.67 | 14.69 |
| Total lens length | 201.66 | 204.48 | 204.68 |
| BF | 22.89 | 23.95 | 25.47 |
| d5 | 6.28 | 15.21 | 23.73 |
| d14 | 9.71 | 6.14 | 0.35 |
| d15 | 5.54 | 3.57 | 1.35 |
| d24 | 19.16 | 18.27 | 16.14 |

-continued

Unit: mm

| d27 | 2.75 | 2.01 | 2.32 |
|---|---|---|---|
| d39 | 21.73 | 22.79 | 24.31 |

Lens unit data

| Unit | First surface | Focal length |
|---|---|---|
| 1 | 1 | 106.65 |
| 2 | 6 | -31.54 |
| 3 | 16 | 62.72 |
| 4 | 25 | -124.57 |
| 5 | 28 | 43.68 |

[Numerical Data 4]

Unit: mm

Surface data

| Surface number | r | d | nd | νd |
|---|---|---|---|---|
| 1 | 111.453 | 2.40 | 1.95906 | 17.5 |
| 2 | 70.161 | 6.40 | 1.77250 | 49.6 |
| 3 | 206.857 | 0.00 | | |
| 4 | 71.288 | 6.31 | 1.77250 | 49.6 |
| 5 | 287.404 | (Variable) | | |
| 6 | 59.612 | 1.50 | 1.72916 | 54.7 |
| 7 | 24.398 | 8.57 | | |
| 8* | -81.842 | 1.50 | 1.76802 | 49.2 |
| 9 | 89.992 | 0.48 | | |
| 10 | 48.337 | 4.10 | 2.00069 | 25.5 |
| 11 | -316.260 | 1.50 | 1.49700 | 81.6 |
| 12 | 95.575 | 5.43 | | |
| 13* | -35.973 | 1.50 | 1.69350 | 53.2 |
| 14 | -118.318 | (Variable) | | |
| 15 (Stop) | ∞ | (Variable) | | |
| 16* | 67.194 | 3.70 | 1.55332 | 71.7 |
| 17 | -429.904 | 0.98 | | |
| 18 | 45.484 | 5.35 | 1.59282 | 68.6 |
| 19 | -610.591 | 0.98 | | |
| 20 | 36.144 | 1.90 | 1.68893 | 31.1 |
| 21 | 30.168 | 1.10 | | |
| 22 | 36.403 | 1.85 | 1.68893 | 31.1 |
| 23 | 20.264 | 4.90 | 1.53775 | 74.7 |
| 24 | 36.132 | (Variable) | | |
| 25 | -48.791 | 3.05 | 1.51633 | 64.1 |
| 26 | -27.699 | 1.90 | 1.51742 | 52.4 |
| 27 | -284.366 | (Variable) | | |
| 28* | 57.717 | 5.55 | 1.59201 | 67.0 |
| 29 | -143.001 | 0.50 | | |
| 30 | 66.073 | 5.55 | 1.59282 | 68.6 |
| 31 | -143.001 | 0.50 | | |
| 32 | 62.438 | 5.00 | 1.59282 | 68.6 |
| 33 | -233.661 | 2.00 | 1.67270 | 32.1 |
| 34 | 55.581 | 10.63 | | |
| 35 | -34.210 | 1.50 | 1.51823 | 58.9 |
| 36 | 44.643 | 6.20 | 1.83481 | 42.7 |
| 37* | -180.811 | (Variable) | | |
| 38 | ∞ | 1.00 | 1.51633 | 64.1 |
| 39 | ∞ | 0.50 | | |
| Image plane | ∞ | | | |

Aspherical surface data

Eighth surface

K = 0.00000e+000   A4 = 1.50075e-006   A6 = 2.39460e-009
A8 = 2.61791e-013

Thirteenth surface

K = 0.00000e+000   A4 = -1.50233e-006   A6 = -6.46557e-010
A8 = 1.62915e-012

-continued

Unit: mm

Sixteenth surface

K = 0.00000e+000   A4 = -2.14142e-006   A6 = -2.30048e-010

Twenty-eighth surface

K = 0.00000e+000   A4 = -8.96894e-007   A6 = 9.38652e-010
A8 = 3.91074e-013

Thirty-seventh surface

K = 0.00000e+000   A4 = 5.54143e-006   A6 = -1.99348e-009

Various data
Zoom ratio 1.60

| | Wide angle | Intermediate | Telephoto |
|---|---|---|---|
| Focal length | 51.50 | 64.00 | 82.52 |
| F-number | 1.85 | 1.85 | 1.85 |
| Half angle of view (degrees) | 22.79 | 18.68 | 14.69 |
| Total lens length | 157.90 | 163.35 | 164.70 |
| BF | 23.10 | 21.18 | 23.15 |
| d5 | 4.87 | 16.41 | 22.43 |
| d14 | 8.66 | 3.86 | 0.46 |
| d15 | 2.58 | 4.66 | 1.00 |
| d24 | 12.03 | 10.90 | 12.87 |
| d27 | 3.82 | 3.52 | 1.95 |
| d37 | 21.94 | 20.02 | 21.99 |

Lens unit data

| Unit | First surface | Focal length |
|---|---|---|
| 1 | 1 | 96.44 |
| 2 | 6 | -28.28 |
| 3 | 16 | 49.25 |
| 4 | 25 | -114.41 |
| 5 | 28 | 42.20 |

[Numerical Data 5]

Unit: mm

Surface data

| Surface number | r | d | nd | νd |
|---|---|---|---|---|
| 1 | 109.742 | 2.40 | 1.95906 | 17.5 |
| 2 | 72.286 | 6.60 | 1.77250 | 49.6 |
| 3 | 189.779 | 0.00 | | |
| 4 | 80.888 | 6.40 | 1.77250 | 49.6 |
| 5 | 342.197 | (Variable) | | |
| 6 | 51.829 | 1.50 | 1.72916 | 54.7 |
| 7 | 25.580 | 9.62 | | |
| 8* | -110.523 | 1.50 | 1.76802 | 49.2 |
| 9 | 72.232 | 1.17 | | |
| 10 | 47.243 | 3.70 | 2.00069 | 25.5 |
| 11 | 1,558.249 | 1.50 | 1.49700 | 81.6 |
| 12 | 74.344 | 5.62 | | |
| 13* | -34.850 | 1.50 | 1.69350 | 53.2 |
| 14 | -79.654 | (Variable) | | |
| 15 (Stop) | ∞ | (Variable) | | |
| 16* | 64.719 | 3.40 | 1.69680 | 55.5 |
| 17 | 7,423.582 | 4.73 | | |
| 18 | 48.725 | 4.50 | 1.61800 | 63.3 |
| 19 | 697.029 | 1.48 | | |
| 20 | 44.737 | 1.50 | 1.76182 | 26.5 |
| 21 | 24.312 | 3.70 | 1.49700 | 81.5 |
| 22 | 36.910 | 18.62 | | |
| 23 | -62.035 | 1.50 | 1.52249 | 59.8 |
| 24 | -164.311 | 2.14 | | |
| 25* | 57.717 | 5.40 | 1.59201 | 67.0 |
| 26 | -152.932 | 0.66 | | |
| 27 | 61.919 | 5.40 | 1.59282 | 68.6 |

-continued

Unit: mm

| | | | | |
|---|---|---|---|---|
| 28 | −152.932 | 0.66 | | |
| 29 | 65.400 | 5.10 | 1.59282 | 68.6 |
| 30 | −137.104 | 2.00 | 1.67270 | 32.1 |
| 31 | 47.283 | 8.84 | | |
| 32 | −30.948 | 2.00 | 1.51823 | 58.9 |
| 33 | 42.005 | 6.20 | 1.83481 | 42.7 |
| 34* | −190.478 | (Variable) | | |
| 35 | ∞ | 1.00 | 1.51633 | 64.1 |
| 36 | ∞ | 0.50 | | |
| Image plane | ∞ | | | |

Aspherical surface data

Eighth surface

K = 0.00000e+000   A4 = 1.02075e−006   A6 = 2.07042e−009
A8 = 1.80371e−012

Thirteenth surface

K = 0.00000e+000   A4 = −5.54660e−007   A6 = −2.77354e−009
A8 = 2.55059e−012

Sixteenth surface

K = 0.00000e+000   A4 = −1.83027e−006   A6 = −1.61472e−010

Twenty-fifth surface

K = 0.00000e+000   A4 = 9.30273e−008   A6 = 8.05610e−010
A8 = 2.45592e−013

Thirty-fourth surface

K = 0.00000e+000   A4 = 5.54308e−006   A6 = −1.85015e−009

Various data
Zoom ratio 1.60

| | Wide angle | Intermediate | Telephoto |
|---|---|---|---|
| Focal length | 51.50 | 64.00 | 82.52 |
| F-number | 1.85 | 1.85 | 1.85 |
| Half angle of view (degrees) | 22.79 | 18.68 | 14.69 |
| Total lens length | 162.20 | 166.10 | 169.69 |
| BF | 23.12 | 24.59 | 23.92 |
| d5 | 6.01 | 14.29 | 24.73 |
| d14 | 10.35 | 6.65 | 0.49 |
| d15 | 3.36 | 1.20 | 1.19 |
| d34 | 21.96 | 23.43 | 22.76 |

Lens unit data

| Unit | First surface | Focal length |
|---|---|---|
| 1 | 1 | 106.46 |
| 2 | 6 | −31.50 |
| 3 | 16 | 41.81 |

[Numerical Data 6]

Unit: mm

Surface data

| Surface number | r | d | nd | vd |
|---|---|---|---|---|
| 1 | 118.465 | 2.40 | 1.95906 | 17.5 |
| 2 | 73.653 | 7.65 | 1.77250 | 49.6 |
| 3 | 281.366 | 0.00 | | |
| 4 | 72.988 | 6.60 | 1.77250 | 49.6 |
| 5 | 257.435 | (Variable) | | |
| 6 | 61.187 | 1.50 | 1.72916 | 54.7 |
| 7 | 23.734 | 8.44 | | |
| 8* | −68.598 | 1.50 | 1.76802 | 49.2 |
| 9 | 78.225 | 0.48 | | |
| 10 | 51.565 | 4.60 | 2.00069 | 25.5 |
| 11 | −283.617 | 1.50 | 1.49700 | 81.6 |
| 12 | 619.313 | 4.69 | | |
| 13* | −37.316 | 1.50 | 1.69350 | 53.2 |
| 14 | −129.702 | (Variable) | | |
| 15 (Stop) | ∞ | (Variable) | | |
| 16* | 70.076 | 3.80 | 1.55332 | 71.7 |
| 17 | 4,554.489 | 2.87 | | |
| 18 | 50.045 | 7.00 | 1.59282 | 68.6 |
| 19 | −295.220 | 2.87 | | |
| 20 | 36.906 | 1.90 | 1.73800 | 32.3 |
| 21 | 22.273 | 5.70 | 1.49700 | 81.5 |
| 22 | 34.688 | (Variable) | | |
| 23 | −48.555 | 7.10 | 1.51633 | 64.1 |
| 24 | −22.273 | 1.90 | 1.51742 | 52.1 |
| 25 | −96.860 | 2.00 | | |
| 26* | 57.717 | 5.40 | 1.59201 | 67.0 |
| 27 | −183.032 | 1.50 | | |
| 28 | 63.373 | 5.40 | 1.59282 | 68.6 |
| 29 | −183.032 | 1.50 | | |
| 30 | 92.851 | 5.25 | 1.59282 | 68.6 |
| 31 | −89.192 | 2.00 | 1.67270 | 32.1 |
| 32 | 51.149 | 9.50 | | |
| 33 | −35.664 | 2.00 | 1.51823 | 58.9 |
| 34 | 39.995 | 7.45 | 1.83481 | 42.7 |
| 35* | −150.094 | (Variable) | | |
| 36 | ∞ | 1.00 | 1.51633 | 64.1 |
| 37 | ∞ | 0.50 | | |
| Image plane | ∞ | | | |

Aspherical surface data

Eighth surface

K = 0.00000e+000   A4 = 1.99041e−006   A6 = 2.78559e−009
A8 = −4.04854e−012

Thirteenth surface

K = 0.00000e+000   A4 = −1.47930e−006   A6 = −2.77297e−010
A8 = 4.91393e−012

Sixteenth surface

K = 0.00000e+000   A4 = −2.10544e−006   A6 = −2.43576e−010

Twenty-sixth surface

K = 0.00000e+000   A4 = −8.79499e−007   A6 = 4.90220e−010
A8 = 2.46390e−013

Thirty-fifth surface

K = 0.00000e+000   A4 = 4.97037e−006   A6 = −1.78821e−009

Various data
Zoom ratio 1.60

| | Wide angle | Intermediate | Telephoto |
|---|---|---|---|
| Focal length | 51.50 | 64.06 | 82.52 |
| F-number | 1.65 | 1.65 | 1.65 |
| Half angle of view (degrees) | 22.79 | 18.66 | 14.69 |
| Total lens length | 169.17 | 173.43 | 175.37 |
| BF | 25.27 | 24.75 | 24.78 |
| d5 | 4.50 | 14.88 | 23.56 |
| d14 | 8.79 | 4.94 | 0.47 |
| d15 | 2.11 | 2.39 | 1.00 |
| d22 | 12.49 | 10.46 | 9.54 |
| d35 | 24.11 | 23.59 | 23.62 |

Lens unit data

| Unit | First surface | Focal length |
|---|---|---|
| 1 | 1 | 96.08 |
| 2 | 6 | −27.74 |
| 3 | 16 | 51.86 |
| 4 | 23 | 63.63 |

[Numerical Data 7]

Unit: mm

Surface data

| Surface number | r | d | nd | vd |
|---|---|---|---|---|
| 1 | 171.532 | 2.40 | 1.95906 | 17.5 |
| 2 | 96.967 | 9.50 | 1.77250 | 49.6 |
| 3 | 1,427.522 | 0.00 | | |
| 4 | 86.754 | 6.85 | 1.80420 | 46.5 |
| 5 | 275.527 | (Variable) | | |
| 6 | 112.887 | 1.50 | 1.77250 | 49.6 |
| 7 | 33.093 | 10.26 | | |
| 8* | −124.517 | 1.50 | 1.76802 | 49.2 |
| 9 | 89.574 | 0.48 | | |
| 10 | 64.423 | 7.35 | 2.00069 | 25.5 |
| 11 | −182.932 | 1.50 | 1.64000 | 60.1 |
| 12 | 444.176 | 7.61 | | |
| 13* | −44.932 | 1.50 | 1.69680 | 55.5 |
| 14 | −291.025 | (Variable) | | |
| 15 (Stop) | ∞ | (Variable) | | |
| 16* | 69.405 | 6.10 | 1.55332 | 71.7 |
| 17 | 607.527 | 0.50 | | |
| 18 | 83.103 | 4.60 | 1.59282 | 68.6 |
| 19 | 220.118 | 0.50 | | |
| 20 | 73.236 | 7.30 | 1.80400 | 46.6 |
| 21 | 1,343.986 | 0.50 | | |
| 22 | 47.808 | 1.50 | 1.68893 | 31.1 |
| 23 | 26.634 | 7.35 | 1.49700 | 81.5 |
| 24 | 35.611 | (Variable) | | |
| 25 | −46.139 | 8.60 | 1.62299 | 58.2 |
| 26 | −26.634 | 1.70 | 1.62588 | 35.7 |
| 27 | −137.427 | (Variable) | | |
| 28* | 57.717 | 7.75 | 1.59201 | 67.0 |
| 29 | −374.819 | 0.50 | | |
| 30 | 63.024 | 7.75 | 1.59201 | 67.0 |
| 31 | −374.819 | 0.50 | | |
| 32 | 52.078 | 8.00 | 1.59201 | 67.0 |
| 33 | −515.160 | 2.00 | 1.66680 | 33.0 |
| 34 | 44.739 | 7.62 | | |
| 35 | −333.539 | 1.50 | 1.58913 | 61.1 |
| 36 | 28.075 | 8.50 | 1.83220 | 40.1 |
| 37* | 190.131 | 7.56 | | |
| 38 | −58.977 | 1.50 | 1.75520 | 27.5 |
| 39 | 446.304 | 0.90 | | |
| 40 | 48.389 | 10.20 | 1.68893 | 31.1 |
| 41 | −89.179 | 1.50 | 1.58913 | 61.1 |
| 42 | 112.297 | (Variable) | | |
| 43 | ∞ | 1.00 | 1.51633 | 64.1 |
| 44 | ∞ | 0.50 | | |
| Image plane | ∞ | | | |

Aspherical surface data

Eighth surface

K = 0.00000e+000    A4 = 5.79610e−007    A6 = 3.50743e−010
A8 = −1.07032e−013

Thirteenth surface

K = 0.00000e+000    A4 = −1.12375e−007    A6 = 2.27487e−010
A8 = 3.95966e−013

Sixteenth surface

K = 0.00000e+000    A4 = −1.15447e−006    A6 = 3.61481e−011

Twenty-eighth surface

K = 0.00000e+000    A4 = −9.69621e−007    A6 = 3.25409e−010
A8 = −2.31811e−013

Thirty-seventh surface

K = 0.00000e+000    A4 = 6.26621 e−006    A6 = 1.51543 e−009

Unit: mm

Various data
Zoom ratio 1.60

| | Wide angle | Intermediate | Telephoto |
|---|---|---|---|
| Focal length | 51.50 | 64.02 | 82.52 |
| F-number | 1.24 | 1.24 | 1.24 |
| Half angle of view (degrees) | 22.79 | 18.67 | 14.69 |
| Total lens length | 201.20 | 205.12 | 205.15 |
| BF | 6.50 | 6.92 | 8.92 |
| d5 | 5.98 | 15.46 | 23.24 |
| d14 | 7.63 | 5.16 | 0.49 |
| d15 | 6.50 | 4.22 | 1.02 |
| d24 | 17.70 | 17.48 | 16.06 |
| d27 | 2.00 | 0.99 | 0.53 |
| d42 | 5.34 | 5.76 | 7.76 |

Lens unit data

| Unit | First surface | Focal length |
|---|---|---|
| 1 | 1 | 105.59 |
| 2 | 6 | −30.90 |
| 3 | 16 | 55.51 |
| 4 | 25 | −115.29 |
| 5 | 28 | 43.33 |

[Numerical Data 8]

Unit: mm

Surface data

| Surface number | r | d | nd | vd |
|---|---|---|---|---|
| 1 | 172.685 | 2.40 | 1.95906 | 17.5 |
| 2 | 97.128 | 11.60 | 1.77250 | 49.6 |
| 3 | 1,260.147 | 0.00 | | |
| 4 | 95.892 | 7.45 | 1.83481 | 42.7 |
| 5 | 284.832 | (Variable) | | |
| 6 | 108.086 | 1.50 | 1.77250 | 49.6 |
| 7 | 35.196 | 11.42 | | |
| 8* | −115.742 | 1.50 | 1.76802 | 49.2 |
| 9 | 90.869 | 1.07 | | |
| 10 | 71.464 | 8.00 | 2.00069 | 25.5 |
| 11 | −181.165 | 1.50 | 1.59282 | 68.6 |
| 12 | 284.854 | 8.90 | | |
| 13* | −48.108 | 1.50 | 1.69680 | 55.5 |
| 14 | −182.564 | (Variable) | | |
| 15 (Stop) | ∞ | (Variable) | | |
| 16* | 70.144 | 6.95 | 1.55332 | 71.7 |
| 17 | 528.295 | 0.82 | | |
| 18 | 93.412 | 4.75 | 1.59282 | 68.6 |
| 19 | 233.393 | 0.82 | | |
| 20 | 73.621 | 7.85 | 1.80400 | 46.6 |
| 21 | 509.444 | 0.82 | | |
| 22 | 52.096 | 1.50 | 1.68893 | 31.1 |
| 23 | 28.597 | 8.50 | 1.49700 | 81.5 |
| 24 | 37.446 | (Variable) | | |
| 25 | −52.206 | 10.10 | 1.62299 | 58.2 |
| 26 | −28.597 | 1.70 | 1.63980 | 34.5 |
| 27 | −149.176 | (Variable) | | |
| 28* | 57.717 | 8.85 | 1.59201 | 67.0 |
| 29 | −413.417 | 0.51 | | |
| 30 | 66.184 | 8.85 | 1.59201 | 67.0 |
| 31 | −413.417 | 0.51 | | |
| 32 | 53.587 | 8.70 | 1.59201 | 67.0 |
| 33 | −1,462.513 | 2.40 | 1.68893 | 31.1 |
| 34 | 43.534 | 7.62 | | |
| 35 | −611.577 | 1.50 | 1.56384 | 60.7 |
| 36 | 29.760 | 9.70 | 1.85026 | 32.3 |
| 37* | 206.375 | 6.75 | | |
| 38 | −76.654 | 1.50 | 1.64769 | 33.8 |

-continued

Unit: mm

| | | | | |
|---|---|---|---|---|
| 39 | 102.620 | 0.90 | | |
| 40 | 42.743 | 9.85 | 1.63854 | 55.4 |
| 41 | −463.892 | 1.50 | 1.61272 | 58.7 |
| 42 | 125.872 | (Variable) | | |
| 43 | ∞ | 1.00 | 1.51633 | 64.1 |
| 44 | ∞ | 0.50 | | |
| Image plane | ∞ | | | |

Aspherical surface data

Eighth surface

K = 0.00000e+000   A4 = 4.14074e−007   A6 = 1.91857e−010
A8 = −1.05589e−013

Thirteenth surface

K = 0.00000e+000   A4 = −9.40306e−008   A6 = 1.51682e−010
A8 = 1.06334e−013

Sixteenth surface

K = 0.00000e+000   A4 = −9.58458e−007   A6 = 2.98630e−011

Twenty-eighth surface

K = 0.00000e+000   A4 = −1.08110e−006   A6 = 2.11720e−010
A8 = −1.34316e−013

Thirty-seventh surface

K = 0.00000e+000   A4 = 5.19093e−006   A6 = 1.08712e−009

-continued

Unit: mm

Various data
Zoom ratio 1.60

| | Wide angle | Intermediate | Telephoto |
|---|---|---|---|
| Focal length | 51.50 | 64.17 | 82.52 |
| F-number | 1.13 | 1.13 | 1.13 |
| Half angle of view (degrees) | 22.79 | 18.63 | 14.69 |
| Total lens length | 220.20 | 225.05 | 224.20 |
| BF | 6.51 | 6.53 | 8.64 |
| d5 | 6.89 | 17.43 | 25.67 |
| d14 | 9.19 | 6.54 | 0.49 |
| d15 | 6.50 | 4.43 | 1.39 |
| d24 | 19.29 | 19.62 | 17.25 |
| d27 | 2.02 | 0.70 | 0.96 |
| d42 | 5.35 | 5.37 | 7.48 |

Lens unit data

| Unit | First surface | Focal length |
|---|---|---|
| 1 | 1 | 113.81 |
| 2 | 6 | −33.11 |
| 3 | 16 | 61.62 |
| 4 | 25 | −126.56 |
| 5 | 28 | 43.85 |

TABLE 1

| | | Example 1 | Example 2 | Example 3 | Example 4 | Example 5 | Example 6 | Example 7 | Example 8 |
|---|---|---|---|---|---|---|---|---|---|
| Conditional Expression (1) | Fno | 1.44 | 1.44 | 1.24 | 1.85 | 1.85 | 1.64 | 1.24 | 1.13 |
| Conditional Expression (2) | LRW/LW | 0.53 | 0.59 | 0.53 | 0.50 | 0.48 | 0.52 | 0.62 | 0.61 |
| | LW | 184.33 | 187.84 | 201.66 | 157.90 | 162.20 | 169.17 | 201.20 | 220.20 |
| | LRW | 97.34 | 111.34 | 107.00 | 79.00 | 77.84 | 87.64 | 124.13 | 134.26 |
| Conditional Expression (3) | LRAW/LRW | 0.15 | 0.13 | 0.18 | 0.15 | 0.24 | 0.14 | 0.14 | 0.14 |
| | LRAW | 14.57 | 14.59 | 19.16 | 12.03 | 18.62 | 12.49 | 17.70 | 19.29 |
| Conditional Expression (4) | BKW/LRW | 0.26 | 0.11 | 0.21 | 0.29 | 0.30 | 0.29 | 0.05 | 0.05 |
| | BKW | 25.27 | 12.38 | 22.89 | 23.10 | 23.12 | 25.27 | 6.50 | 6.51 |
| Conditional Expression (5) | N | 14 | 16 | 14 | 13 | 11 | 12 | 16 | 16 |
| Conditional Expression (6) | BKW/f1 | 0.24 | 0.12 | 0.21 | 0.24 | 0.22 | 0.26 | 0.06 | 0.06 |
| | f1 | 104.33 | 99.10 | 106.46 | 96.44 | 106.46 | 96.08 | 105.59 | 113.81 |
| Conditional Expression (7) | LLW/LW | 0.67 | 0.66 | 0.64 | 0.65 | 0.62 | 0.67 | 0.65 | 0.64 |
| | LLW | 122.61 | 123.71 | 129.89 | 102.10 | 100.96 | 112.91 | 130.63 | 140.77 |
| Conditional Expression (8) | fLAW/fLRW | −0.74 | −0.73 | −0.72 | −0.89 | −1.00 | −0.84 | −0.75 | −0.71 |
| | fLAW | −34.67 | −33.94 | −35.74 | −36.55 | −41.67 | −37.22 | −32.47 | −35.39 |
| | fLRW | 46.97 | 46.38 | 49.89 | 41.08 | 41.81 | 44.08 | 43.33 | 50.16 |
| Conditional Expression (9) | (AR1 − AR2)/(AR1 + AR2) | −5.53 | −5.46 | −8.07 | −6.71 | −3.94 | −6.00 | −7.77 | −6.07 |
| | AR1 | 34.391 | 33.654 | 38.262 | 36.132 | 36.910 | 34.688 | 35.611 | 37.446 |
| | AR2 | −49.560 | −48.733 | −49.084 | −48.791 | −62.035 | −48.555 | −46.139 | −52.206 |
| Conditional Expression (10) | fLAW/fLRfW | −0.64 | −0.62 | −0.57 | −0.74 | −0.72 | −0.72 | −0.58 | −0.57 |
| | fLRfW | 54.30 | 54.47 | 62.72 | 49.25 | 58.09 | 51.86 | 55.51 | 61.62 |
| Conditional Expression (11) | fLAW/fLReW | −0.54 | −0.53 | −0.59 | −0.60 | −0.65 | −0.58 | −0.50 | −0.57 |
| | fLReW | 63.73 | 64.01 | 60.87 | 61.33 | 63.90 | 63.63 | 64.83 | 62.12 |
| Conditional Expression (12) | fLRfW/fLReW | 0.85 | 0.85 | 1.03 | 0.80 | 0.91 | 0.81 | 0.86 | 0.99 |
| Conditional Expression (13) | fLRW/f1 | 0.45 | 0.47 | 0.47 | 0.43 | 0.39 | 0.46 | 0.41 | 0.44 |
| Conditional Expression (14) | fLRW/f2 | −1.62 | −1.60 | −1.58 | −1.45 | −1.33 | −1.59 | −1.40 | −1.52 |
| | f2 | −29.07 | −28.94 | −31.54 | −28.28 | −31.50 | −27.74 | −30.90 | −33.11 |
| Conditional Expression (15) | f1/f2 | −3.59 | −3.42 | −3.38 | −3.41 | −3.38 | −3.46 | −3.42 | −3.44 |
| Conditional Expression (16) | f1/f3 | 1.92 | 1.82 | 1.70 | 1.96 | 2.55 | 1.85 | 1.90 | 1.85 |
| | f3 | 54.30 | 54.47 | 62.72 | 49.25 | 41.81 | 51.86 | 55.51 | 61.62 |
| Conditional Expression (17) | f2/f3 | −0.54 | −0.53 | −0.50 | −0.57 | −0.75 | −0.53 | −0.56 | −0.54 |
| Conditional Expression (18) | M1/M2 | −0.60 | −0.36 | −0.21 | −0.63 | −0.67 | −0.48 | −0.30 | −0.27 |
| | M1 | −7.35 | −4.69 | −3.02 | −6.80 | −7.49 | −6.19 | −3.94 | −4.00 |
| | M2 | 12.33 | 12.87 | 14.44 | 10.76 | 11.23 | 12.87 | 13.32 | 14.78 |
| Conditional Expression (19) | M2/f1 | 0.118 | 0.130 | 0.135 | 0.112 | 0.105 | 0.134 | 0.126 | 0.130 |
| Conditional Expression (20) | M1/f1 | −0.070 | −0.047 | −0.028 | −0.070 | −0.070 | −0.064 | −0.037 | −0.035 |
| Conditional Expression (21) | β2T | −0.833 | −0.925 | −0.921 | −0.938 | −0.950 | −0.934 | −0.905 | −0.919 |
| Conditional Expression (22) | (RR1 − RR2)/(RR1 + RR2) | −0.60 | −0.59 | −0.66 | −0.53 | −0.39 | −0.55 | −0.73 | −0.58 |
| | RR1 | −39.288 | −40.818 | −42.716 | −35.973 | −34.850 | −37.316 | −44.932 | −48.108 |
| | RR2 | −156.054 | −159.734 | −212.080 | −118.318 | −79.654 | −129.702 | −291.025 | −182.564 |

TABLE 1-continued

|  |  | Example 1 | Example 2 | Example 3 | Example 4 | Example 5 | Example 6 | Example 7 | Example 8 |
|---|---|---|---|---|---|---|---|---|---|
| Conditional Expression (23) | fR/f2 | 2.61 | 2.73 | 2.44 | 2.66 | 2.88 | 2.74 | 2.47 | 2.84 |
|  | fR | −75.755 | −79.095 | −77.044 | −75.094 | −90.583 | −76.047 | −76.449 | −94.176 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-019219, filed Feb. 6, 2018, which is hereby incorporated by reference herein in its entirety.

What is claimed is:

1. A zoom lens comprising a plurality of lens units, an interval between each pair of adjacent lens units among the plurality of lens units being changed during zooming, the plurality of lens units consisting of, in order from an object side to an image side, a first lens unit having a positive refractive power, a second lens unit having a negative refractive power, and a rear lens group including at least one lens unit, wherein the following conditional expressions are satisfied:

$0.70 < F < 2.50$;

$0.36 < LRW/LW < 1.00$;

$0.02 < LRAW/LRW < 0.18$;

$0.01 < BKW/LRW < 0.40$; and $10 < N < 30$, where F represents a minimum F-number of an entire system of the zoom lens during zooming from a wide angle end to a telephoto end, LRW represents an interval, at the wide angle end, between a lens surface on the object side of a lens arranged closest to the object side of the rear lens group and a lens surface on the image side of a lens arranged closest to the image side of the rear lens group, LW represents a distance from a lens surface on the object side of a lens arranged closest to the object side of the zoom lens to an image plane at the wide angle end, LRAW represents a widest lens interval having a widest interval at the wide angle end among lens intervals included in the rear lens group, BKW represents an air-equivalent distance from a lens surface on the image side of a lens arranged closest to the image side of the zoom lens to the image plane at the wide angle end, and N represents a number of lenses included in the rear lens group.

2. A zoom lens according to claim 1, wherein the following conditional expression is satisfied:

$0.01 < BKW/LRW < 0.35$, where f1 represents a focal length of the first lens unit.

3. A zoom lens according to claim 1, wherein the following conditional expression is satisfied:

$0.50 < LLW/LW < 1.00$, where LLW represents an interval, at the wide angle end, between an image plane and the lens surface on the object side of the lens arranged closest to the object side of the rear lens group.

4. A zoom lens according to claim 1, wherein the following conditional expression is satisfied:

$-20.00 < fLAW/fLRW < -0.10$, where fLAW represents a focal length of an air lens, which is formed by a lens surface on the object side of the widest lens interval and a lens surface on the image side of the widest lens interval, and fLRW represents a focal length of the rear lens group at wide angle end.

5. A zoom lens according to claim 1, wherein the following conditional expression is satisfied:

$-1,000.00 < (AR1-AR2)/(AR1+AR2) < -1.00$, where AR1 represent a curvature radius of a lens surface on the image side of a lens placed on the object side of two lenses forming the widest lens interval and AR2 represents a curvature radius of a lens surface on the object side of a lens placed on the image side of two lenses forming the widest lens interval.

6. A zoom lens according to claim 1, wherein the following conditional expression is satisfied:

$-2.50 < fLAW/fLRfW < -0.25$, where fLAW represents a focal length of an air lens, which is formed by a lens surface on the object side of the widest lens interval and a lens surface on the image side of the widest lens interval, and fLRfW represents a combined focal length of all lenses, which is included in the rear lens group, and is arranged closer to the object side than the widest lens interval.

7. A zoom lens according to claim 1, wherein the following conditional expression is satisfied:

$-2.50 < fLAW/fLReW < -0.25$, where fLAW represents a focal length of an air lens, which is formed by a lens surface on the object side of the widest lens interval and a lens surface on the image side of the widest lens interval, and fLReW represents a combined focal length of all lenses, which is included in the rear lens group, and is arranged closer to the image side than the widest lens interval.

8. A zoom lens according to claim 1, wherein the following conditional expression is satisfied:

$0.50 < fLRfW/fLReW < 2.00$, where fLRfW represents a combined focal length of all lenses, which are included in the rear lens group, and are arranged closer to the object side than the widest lens interval, and fLReW represents a combined focal length of all lenses, which are included in the rear lens group, and are arranged on the image side of the widest lens interval.

9. A zoom lens according to claim 1, wherein the following conditional expression is satisfied:

$0.10 < fLRW/f1 < 1.00$, where fLRW represents a focal length of the rear lens group at the wide angle end, and f1 represents a focal length of the first lens unit.

10. A zoom lens according to claim 1, wherein the following conditional expression is satisfied:

−3.00<fLRW/f2<−1.00, where fLRW represents a focal length of the rear lens group at the wide angle end, and f2 represents a focal length of the second lens unit.

11. A zoom lens according to claim 1, wherein the following conditional expression is satisfied:

−10.00<f1/f2<−2.00, where f1 represents a focal length of the first lens unit, and f2 represents a focal length of the second lens unit.

12. A zoom lens according to claim 1,
wherein the rear lens group includes a third lens unit having a positive refractive power, which is arranged closest to the object side, and
wherein the following conditional expression is satisfied:

1.00<f1/f3<5.00, where f1 represents a focal length of the first lens unit, and f3 represents a focal length of the third lens unit.

13. A zoom lens according to claim 1,
wherein the rear lens group includes a third lens unit having a positive refractive power, which is arranged closest to the object side, and
wherein the following conditional expression is satisfied:

−1.50<f2/f3<−0.30, where f2 represents a focal length of the second lens unit, and f3 represents a focal length of the third lens unit.

14. A zoom lens according to claim 1, wherein the following conditional expression is satisfied:

−2.00<M1/M2<−0.05, where M1 represents an amount of movement of the first lens unit during zooming from the wide angle end to the telephoto end, M2 represents an amount of movement of the second lens unit during zooming from the wide angle end to the telephoto end, a sign of the amount of movement is positive when a corresponding one of the first lens unit and the second lens unit is positioned closer to the image side at the telephoto end as compared to a position at the wide angle end, and the sign of the amount of movement is negative when a corresponding one of the first lens unit and the second lens unit is positioned closer to the object side at the telephoto end as compared to a position at the wide angle end.

15. A zoom lens according to claim 1, wherein the following conditional expression is satisfied:

0.02<M2/f1<0.50, where f1 represents a focal length of the first lens unit, M2 represents an amount of movement of the second lens unit during zooming from the wide angle end to the telephoto end, a sign of the amount of movement is positive when the second lens unit is positioned closer to the image side at the telephoto end as compared to a position at the wide angle end, and the sign of the amount of movement is negative when the second lens unit is positioned closer to the object side at the telephoto end as compared to a position at the wide angle end.

16. A zoom lens according to claim 1, wherein the following conditional expression is satisfied:

−1.00<M1/f1<−0.01, where f1 represents a focal length of the first lens unit, M1 represents an amount of movement of the first lens unit during zooming from the wide angle end to the telephoto end, a sign of the amount of movement is positive when the first lens unit is positioned closer to the image side at the telephoto end as compared to a position at the wide angle end, and the sign of the amount of movement is negative when the first lens unit is positioned closer to the object side at the telephoto end as compared to a position at the wide angle end.

17. A zoom lens according to claim 1, wherein the first lens unit consists of, in order from the object side to the image side, a negative lens, a positive lens, and a positive lens.

18. A zoom lens according to claim 1, wherein the second lens unit is configured to move toward the object side during focusing from infinity to the closest distance.

19. A zoom lens according to claim 1, wherein the following conditional expression is satisfied:

−1.00<β2T<−0.50, where β2T represents a lateral magnification of the second lens unit at the telephoto end.

20. A zoom lens according to claim 1, wherein the second lens unit consists of, in order from the object side to the image side, a negative lens, a negative lens, a positive lens, a negative lens, and a negative lens.

21. A zoom lens according to claim 1, wherein the following conditional expression is satisfied:

−1.00<(RR1−RR2)/(RR1+RR2)<−0.20, where RR1 represents a curvature radius of a lens surface on the object side of a lens arranged closest to the image side of the second lens unit, and RR2 represents a curvature radius of a lens surface on the image side of the lens.

22. A zoom lens according to claim 1, wherein the following conditional expression is satisfied:

1.50<fR/f2<5.00, where f2 represents a focal length of the second lens unit, and fR represents a focal length of a lens of the second lens unit that is arranged closest to the image side.

23. A zoom lens according to claim 1, further comprising an aperture stop arranged between the second lens unit and the rear lens group.

24. A zoom lens according to claim 1, wherein the rear lens group consists of, in order from the object side to the image side, a third lens unit having a positive refractive power, a fourth lens unit having a negative refractive power, and a fifth lens unit having a positive refractive power.

25. A zoom lens according to claim 1, wherein the rear lens group consists of a third lens unit having a positive refractive power.

26. A zoom lens according to claim 1, wherein the rear lens group consists of, in order from the object side to the image side, a third lens unit having a positive refractive power and a fourth lens unit having a positive refractive power.

27. An image pickup apparatus comprising;
a zoom lens; and
an image pickup element configured to receive light of an image formed by the zoom lens,
wherein the zoom lens includes a plurality of lens units, and an interval between each pair of adjacent lens units among the plurality of lens units is changed during zooming, wherein the plurality of lens units consist of, in order from an object side to an image side, a first lens unit having a positive refractive power, a second lens unit having a negative refractive power, and a rear lens group including at least one lens unit, and wherein the following conditional expressions are satisfied:

$0.70 < F < 2.50;$ $0.36 < LRW/LW < 1.00;$ $0.02 < LRAW/LRW < 0.18;$ $0.01 < BKW/LRW < 0.40;$ and $0 < N < 30,$ where F represents the largest full aperture F-number of an entire system of the zoom lens in zooming from a wide angle end to a telephoto end, LRW represents an interval, at the wide angle end, between a lens surface on the object side of a lens arranged closest to the object side of the rear lens group and a lens surface on the image side of a lens arranged closest to the image side of the rear lens group, LW represents a distance from a lens surface on the object side of a lens arranged closest to the object side of the zoom lens to an image plane at the wide angle end, LRAW represents a widest lens interval having a widest interval at the wide angle end among lens intervals included in the rear lens group, BKW represents an air-equivalent distance from a lens surface on the image side of a lens arranged closest to the image side of the zoom lens to the image plane at the wide angle end, and N represents a number of lenses included in the rear lens group.

28. A zoom lens comprising a plurality of lens units, an interval between each pair of adjacent lens units among the plurality of lens units being changed during zooming, the plurality of lens units consisting of, in order from an object side to an image side, a first lens unit having a positive refractive power, a second lens unit having a negative refractive power, and a rear lens group including at least one lens unit, wherein the rear lens group includes a third lens unit having a positive refractive power, which is arranged closest to the object side, and wherein the following conditional expressions are satisfied:

$0.70 < F < 2.50;$ $0.36 < LRW/LW < 1.00;$ $0.02 < LRAW/LRW < 0.18,$ $0.01 < BKW/LRW < 0.40,$ and $1.00 < f1/f3 < 5.00$ where F represents the largest full aperture F-number of an entire system of the zoom lens in zooming from a wide angle end to a telephoto end, LRW represents an interval, at the wide angle end, between a lens surface on the object side of a lens arranged closest to the object side of the rear lens group and a lens surface on the image side of a lens arranged closest to the image side of the rear lens group, LW represents a distance from a lens surface on the object side of a lens arranged closest to the object side of the zoom lens to an image plane at the wide angle end, LRAW represents a widest lens interval having a widest interval at the wide angle end among lens intervals included in the rear lens group, BKW represents an air-equivalent distance from a lens surface on the image side of a lens arranged closest to the image side of the zoom lens to the image plane at the wide angle end, f1 represents a focal length of the third unit.

* * * * *